US00RE43291E

(19) United States
(12) Reissued Patent
Groom

(10) Patent Number: US RE43,291 E
(45) Date of Reissued Patent: Apr. 3, 2012

(54) PFM-PWM DC-DC CONVERTER PROVIDING DC OFFSET CORRECTION TO PWM ERROR AMPLIFIER AND EQUALIZING REGULATED VOLTAGE CONDITIONS WHEN TRANSITIONING BETWEEN PFM AND PWM MODES

(75) Inventor: Terry J. Groom, Lucas, TX (US)

(73) Assignee: Intersil Americas Inc., Milpitas, CA (US)

(21) Appl. No.: 12/792,998

(22) Filed: Jun. 3, 2010

Related U.S. Patent Documents

Reissue of:
(64) Patent No.: 7,382,114
Issued: Jun. 3, 2008
Appl. No.: 11/422,465
Filed: Jun. 6, 2006

U.S. Applications:
(60) Provisional application No. 60/688,029, filed on Jun. 7, 2005.

(51) Int. Cl.
*G05F 1/40* (2006.01)
*G05F 1/56* (2006.01)
*H02H 7/00* (2006.01)

(52) U.S. Cl. ..... 323/271; 323/282; 361/18

(58) Field of Classification Search ..... 323/222, 323/223, 225, 265, 268, 271, 282, 285; 363/50, 363/55, 56.01, 56.11, 56.12; 361/18
See application file for complete search history.

(56) References Cited

U.S. PATENT DOCUMENTS

| | | | | |
|---|---|---|---|---|
| 5,548,206 | A | 8/1996 | Soo | |
| 5,773,966 | A * | 6/1998 | Steigerwald | 323/284 |
| 6,314,007 | B2 | 11/2001 | Johnson, Jr. et al. | |
| 6,426,612 | B1 * | 7/2002 | Rozsypal | 323/282 |
| 6,914,418 | B2 | 7/2005 | Sung | |
| 7,088,599 | B1 | 8/2006 | Muska et al. | |
| 2007/0085519 | A1 | 4/2007 | Xu | |

* cited by examiner

*Primary Examiner* — Matthew Nguyen
(74) *Attorney, Agent, or Firm* — Fogg & Powers LLC

(57) ABSTRACT

To prevent a voltage glitch in the regulated DC output voltage of a PWM/PFM DC-DC converter when switching between PFM and PMW modes, the error amplifier of the converter's PWM regulation path is provided with a DC voltage offset correction mechanism. This mechanism "zeros-out" DC voltage offsets that may be present in the voltage regulation path, thereby enabling the error amplifier to accurately regulate the converter's output voltage. When the converter transitions between PFM and PWM modes, the DC offset correction mechanism establishes initial conditions of the error amplifier that effectively ensure that the converter's regulated output voltage at the beginning of a new "switched-to" PWM mode cycle is DC offset-free.

46 Claims, 9 Drawing Sheets cnt
U_Dbar
OUTPUT CURRENT
L16
vo
1.00
875m
750m
7.0
3.0
-1.0
600m
-350m
-1.3
8.0
3.0
-2.0
1.95
1.80
1.65
(V)
(V)
(A)
(V)
(V)
0.00
95.0u
190u
285u
380u
475u
570u
time ( s )

int
U_Dbar
OUTPUT CURRENT
L16
VO
A
B
1.00
875m
750m
7.0
3.0
-1.0
600m
-350m
-1.3
8.0
3.0
-2.0
1.9750
1.8125
1.6500
(V)
(V)
(A)
(V)
(V)
420.00u
436.25u
452.50u
468.75u
485.00u
501.25u
517.50u
533.75u
550.00u
time ( s )

int
U_Dbar
OUTPUT CURRENT
L16
vo
1.00
875m
750m
7.0
3.0
-1.0
600m
-350m
-1.3
8.0
3.0
-2.0
1.925
1.875
1.825
990.0u
1.000m
1.010m
1.020m
1.030m
1.040m
1.050m
1.060m
time ( s )
( V )
( V )
( A )
( V )
( V )

int
U_Dbar
OUTPUT CURRENTS
vo
1.00
875m
750m
7.0
3.0
-1.0
600m
-350m
-1.3
8.0
3.0
-2.0
1.925
1.875
1.825
1.625m
1.630m
1.635m
1.640m
1.645m
1.650m
time ( s )

int
L16
vo
A
B
OUTPUT CURRENT
rsycn
1.00
895m
790m
7.0
2.5
-2.0
1.9
1.6
1.3
2.0
0.0
-2.0
6.0
-1.0
(V)
(V)
(V)
(V)
(V)
600u
610u
620u
630u
640u
650u
time ( s )

int pwm
L16
vo
output current
7.0
3.0
-1.0
7.0
2.5
-2.0
1.9
1.6
1.3
1.2
0.0
1.2
(V)
(V)
(V)
(A)
599u
603u
607u
611u
615u
619u
time ( s )

PFM-PWM DC-DC CONVERTER PROVIDING DC OFFSET CORRECTION TO PWM ERROR AMPLIFIER AND EQUALIZING REGULATED VOLTAGE CONDITIONS WHEN TRANSITIONING BETWEEN PFM AND PWM MODES

Matter enclosed in heavy brackets [ ] appears in the original patent but forms no part of this reissue specification; matter printed in italics indicates the additions made by reissue.

CROSS-REFERENCE TO RELATED APPLICATION

The present application claims the benefit of co-pending U.S. patent application Ser. No. 60/688,029, filed Jun. 7, 2005, by T. Groom, entitled: "Auto-Zero Error Amplifier Topology for Dual Mode PFM-PWM DC-to-DC Converter and Associated Methods," assigned to the assignee of the present application and the disclosure of which is incorporated herein.

FIELD OF THE INVENTION

The present invention relates in general to DC power supplies and subsystems thereof, and is more particularly directed to a dual-mode—pulse frequency modulation (PFM) mode and pulse width modulation (PWM) mode—based DC-DC converter, the PWM regulation path error amplifier of which is provided with a DC voltage offset correction mechanism. This DC voltage offset correction mechanism is operative, during PWM mode of operation, to inject a DC voltage offset correction, as necessary, into the voltage regulation path through the PWM path error amplifier, so as to effectively zero-out or compensate for any DC voltage offsets that may be present in the voltage regulation path and thereby enable the PWM error amplifier to accurately regulate the converter's output voltage. In addition, when the converter transitions between PFM and PWM modes, the DC offset correction mechanism establishes initial conditions of the PWM error amplifier that are effective to ensure that the output voltage at the beginning of a new "switched-to" PWM mode cycle is equal to output voltage at the end of the previous "switched-from" PFM mode cycle. This effectively prevents the occurrence of a DC offset anomaly in the regulated DC output voltage when transitioning between PFM mode and PWM mode.

BACKGROUND OF THE INVENTION

DC-DC converters are commonly used to supply DC power to electronic devices, such as personal computers, hand-held devices, and the like, and are available in a variety of configurations for deriving a desired DC output voltage from a given source of DC input voltage. For example, a buck mode or step-down DC-DC converter is often used to supply a regulated DC output voltage, whose value is less than the value of the DC source voltage. A typical step-down DC-DC converter includes one or more power switches, current flow paths through which are coupled between a DC input voltage terminal and a reference voltage terminal (e.g., ground), and the common or phase node between which is connected through an output inductor to an output voltage node, to which a storage capacitor and the powered load/device are connected. By controllably switching the power switches on and off, the upstream end of the output inductor is alternately connected between the DC input voltage and the reference voltage. This produces an alternately ramped-up and ramped-down output current through the output inductor to the output node, and causes a stepped-down DC output voltage to be delivered to the load. The DC-DC converter may be configured as a voltage mode converter or a current mode converter.

A voltage mode DC-DC converter, which is typically used in applications where load current demand is relatively large, includes a voltage control loop having an error amplifier, the output of which is used to control a PWM comparator, which generates a PWM voltage waveform. This PWM voltage waveform is applied to driver circuitry, which controls the turn on/off times of the power switches in accordance with times of transitions in respective PWM voltage waveforms with which it drives the power switches. To meet the demand for substantial load current, the PWM waveforms that control the on/off switching of the power switches are typically mutually complementary, so that a conductive path from one or the other of the input voltage source and ground will be continuously provided through one or the other power switch to the output inductor. This mode of operation is customarily referred to as continuous conduction mode (CCM). To regulate the DC output voltage, a voltage representative thereof is fed back to the error amplifier and compared with a DC reference voltage to produce an error voltage. This error voltage is amplified and filtered to produce an input signal to a PWM comparator, and is compared thereby with a sawtooth voltage waveform, to produce the PWM waveform, the pulse width of which is defined in accordance with the crossings of the error voltage threshold by the sawtooth voltage waveform.

A current mode DC-DC converter customarily includes an inner 'current' loop and an outer 'voltage' loop, which controls the inner current loop. The inner current loop contains a current amplifier, the output of which is coupled to comparator that is referenced to an error voltage provided by a voltage error amplifier in the outer voltage loop. As in the voltage mode DC-DC converter, the DC output voltage at the converter's output node is fed back to the error amplifier and compared with a DC reference voltage to produce an error voltage. This error voltage is used as a reference for the comparator of the inner current loop. The output of the comparator is coupled to reset a clocked flip-flop, complementary outputs of which are supplied to respective drivers for the power switches.

In addition to the above-described voltage mode and current DC-DC converters, there is an additional type of DC-DC converter, known as a constant on-time or pulse-frequency modulated (PFM) DC-DC converter. This type of converter is typically used in applications where load current demand is relatively small, as in the case of a "sleep" or "quiescent" mode of operation of a notebook computer, for example. A PFM converter includes a control loop having an error amplifier, the error voltage output of which is used as a voltage reference for a PFM comparator. The output of the comparator is coupled one or more drivers for the power switches. As in the voltage mode and current mode DC-DC converters, described above, the DC output voltage at the PFM converter's output node is fed back to the voltage error amplifier and compared with a DC reference voltage to produce an error voltage. In the control loop for the PFM converter, this error voltage is compared with a reference voltage by the PFM comparator, which outputs a triggering signal for a one-shot that sets a constant on-time for a relatively narrow pulse-width switching signal upon which switching times of the power switches are based. Because of its relatively narrow pulse-width, the switching signal provides the PWM mode converter with ability to turn on the power switches for very short time intervals—just sufficient to meet the very low current demands of the load, thereby saving power and prolonging battery life. This mode of operation is customarily referred to as discontinuous conduction mode (DCM).

In addition to PWM mode and PFM mode converters, described above, there is an additional hybrid architecture, known as a dual-mode, PWM/PFM DC-DC converter, that is designed to take advantage of the operational capabilities of each of PWM mode and PFM mode converters, by switching between PWM mode and PFM mode, depending upon load conditions. Namely, such a dual-mode converter employs PFM control when the output node is lightly loaded, and PWM control when the output node is heavily loaded. High efficiency is achieved by automatically selecting the more efficient mode of regulation, based on a continuous monitoring of the output current and the output voltage. However, a shortcoming of a conventional dual-mode DC-DC converter is the fact that a difference in initial conditions of the two regulation modes may cause the occurrence of a DC voltage anomaly in the output voltage at the time of switching between the two modes.

SUMMARY OF THE INVENTION

In accordance with the present invention, this output voltage anomaly problem is successfully obviated by a new and improved dual-mode PWM/PFM DC-DC converter, which incorporates a DC voltage offset correction mechanism in the voltage regulation path of the PWM mode error amplifier. This DC voltage offset correction mechanism allows gain and DC offsets to be nulled and thus set initial conditions to zero. This allows PWM mode to be initiated without need for correction, thus allowing regulation to resume seamlessly. To this end, during PWM mode, this DC voltage offset correction mechanism is operative to impart a DC voltage offset correction, as necessary, into the voltage regulation path through the PWM error amplifier, so as to effectively compensate for or "zero-out" any DC voltage offsets that may be present in the voltage regulation path, thereby enabling the PWM error amplifier to accurately regulate the converter's output voltage. In addition, when the converter transitions between PFM and PWM modes, the DC offset correction mechanism establishes initial conditions of the PWM error amplifier that effectively ensure that the converter's regulated output voltage at the beginning of a new "switched-to" PWM mode cycle is equal to the regulated output voltage at the end of the previous "switched-from" PFM mode cycle. This effectively prevents the occurrence of a DC offset anomaly in the regulated DC output voltage when transitioning between PFM and PWM modes.

For this purpose, the output of an integrating error amplifier, to which a scaled version of the output voltage is coupled for voltage mode regulation during PWM mode, is coupled as one of two voltage inputs of a DC offset correction circuit and to a transimpedance amplifier. A second voltage input of the correction circuit is coupled to receive the scaled version of the output voltage. During PWM mode, the correction circuit monitors the voltage across the error amplifier and injects a DC offset correction current derived in accordance with this voltage into the output of the transimpedance amplifier. This injected current is reflected back by the transimpedance amplifier as a DC offset correction voltage across its inputs, so that it may be impressed across and charge an integrating capacitor (previously discharged by a controlled shorting switch during PFM mode) of the error amplifier. As a result, the reflected-back voltage across the error amplifier's integrating capacitor effectively compensates for, or "zeroes-out", any accumulated DC voltage offsets that may be present in the PWM error amplifier circuit's voltage regulation path, so that the error amplifier circuit is able to accurately regulate the converter's output voltage. Once the DC offset correction has stabilized, the DC offset correction circuit stores information representative of the necessary correction.

Thereafter, when the converter transitions from PWM mode to PFM mode, the DC offset circuit is disabled, and the integrating capacitor across the error amplifier is discharged by operation of the shorting switch, so that it will be ready to receive an initial value of DC offset-compensating voltage by operation of the DC offset correction, when the converter transitions back to PWM mode from PFM mode. Subsequently, when the converter transitions back from PFM mode to PWM mode, the DC offset correction circuit is again enabled, and injects into the output of the transimpedance amplifier the stored value of correction current that it had been supplying at end of the previous PWM mode cycle. This previously stored value of injected current is reflected back by the transimpedance amplifier as an initial correction voltage across the transimpedance amplifier's inputs, so that it may be impressed across the discharged integrating capacitor of the error amplifier, thereby ensuring that the output of the error amplifier will provide 'glitch-less' (no DC voltage offset) voltage mode regulation of the output voltage as the converter transitions between PFM and PWM modes.

In accordance with a non-limiting implementation, the DC offset correction circuit may comprise a differential amplifier which compares the output of an integrating error amplifier with the scaled version of the output voltage. The logical state of the output of the differential amplifier, which is determined by the polarity of the voltage differential across its inputs, serves as a count-up or count-down control input to a digital up/down counter. The up/down counter is controllably clocked when the converter transitions from PFM mode to PWM mode. The count value of the up/down counter is used to generate the DC offset correction current, that is reflected back into the DC offset correction voltage by the transconductance amplifier to which the output of the integrating error amplifier is coupled.

Clocking of the up/down counter by successive transitions from PFM mode to PWM mode is controllably enabled by the output of an N-bit counter. This N-bit counter counts a prescribed number of times that the count direction control input to the up/down counter switches back and forth between a count-up and count-down condition (as determined by the logical state of the output of the differential amplifier, which effectively monitors the polarity of the voltage differential between the scaled output voltage and the output of the error amplifier). This serves to handle the case where correction is to be continuous. In such a case, it is necessary to determine a minimum time in forced PWM mode. This insures that when the system transitions to PWM mode, it will remain in PWM mode until sufficient time is allowed for the system to settle. Until such settling time has transpired, the system is not allowed to transition back to PWM mode. Auto correction may be allowed any time the controller is in PWM mode and must be enabled in PWM mode.

For this purpose, the N-bit counter serves to determine whether the number of these switching cycles has reached a prescribed count value (e.g., seven, as a non-limiting example). When this happens, it is inferred that the system will have had sufficient time to stabilize, and the output of the N-bit counter will set a latch. The output of this latch is used to enable a logic gate through which transitions to PWM mode are coupled to clock the up/down counter. Once the latch is set, the logic gate is disabled, to prevent further clocking of the up/down counter by the PWM mode transitions. The value of the DC offset current is then fixed by the contents of the up/down counter.

DETAILED DESCRIPTION

Figure 1:
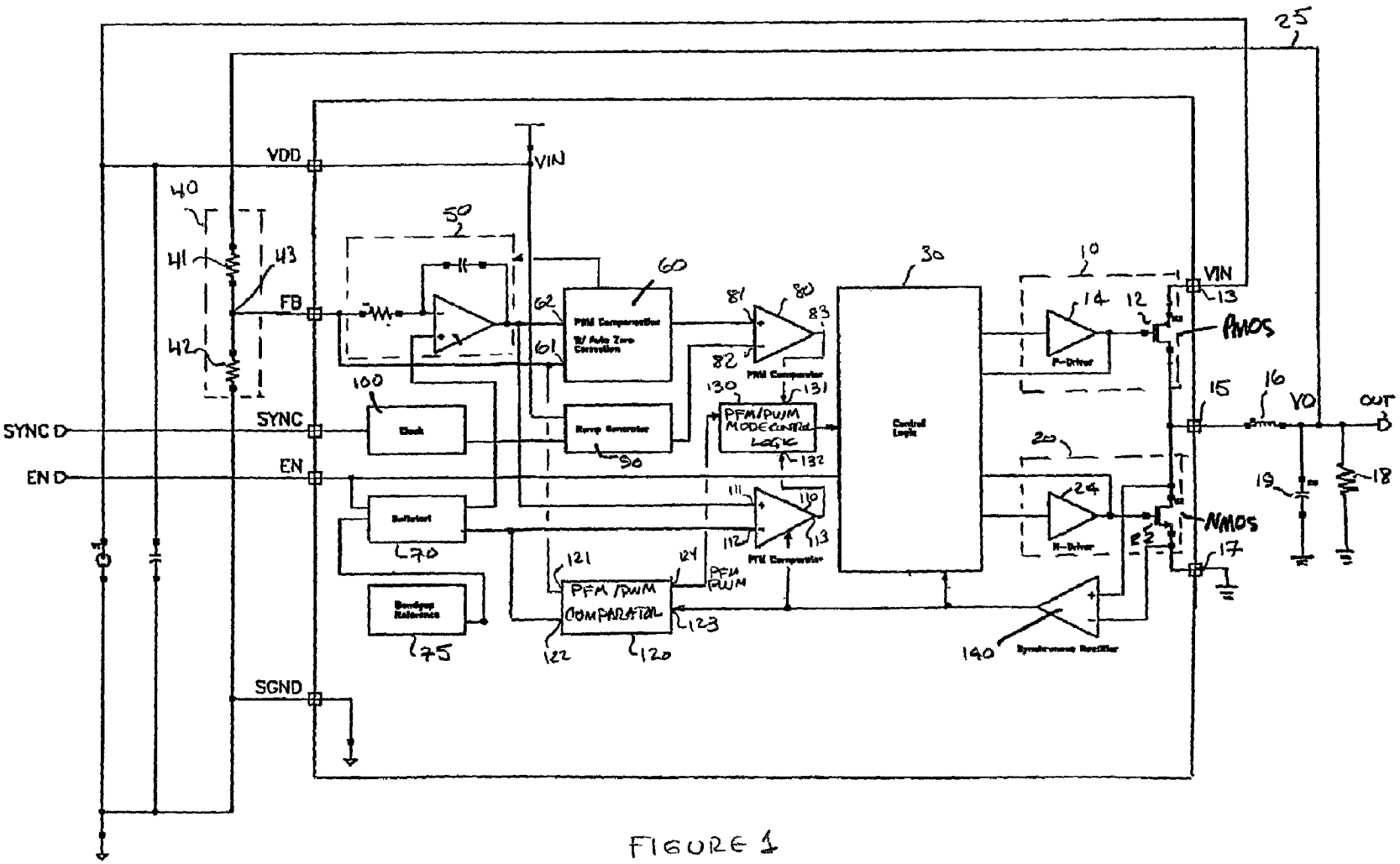
FIG. 1 diagrammatically illustrates the overall architecture of a dual-mode, PWM/PFM DC-DC converter, which incorporates a DC voltage offset correction mechanism in the voltage regulation path of the PWM error amplifier in accordance with the present invention.

Before describing the new and improved dual-mode, PFM/PWM based DC-DC converter that employs DC voltage offset correction in accordance with the present invention, it should be observed that the invention resides primarily in a modular arrangement of conventional power supply circuits and electronic signal processing circuits and components therefor. In a practical implementation that facilitates packaging in a hardware-efficient equipment configuration, these modular arrangements may be readily implemented as field programmable gate array (FPGA)-, or application specific integrated circuit (ASIC)-based chip sets. Consequently, the configuration of this modular arrangement of circuits and components and the manner in which they are interfaced with one another have, for the most part, been illustrated in the drawings by readily understandable block diagrams, and associated signal waveforms, which show only those specific details that are pertinent to the present invention, so as not to obscure the disclosure with details which will be readily apparent to those skilled in the art having the benefit of the description herein. The diagrammatic illustrations are primarily intended to show the major components of a dual-mode, PWM/PFM DC-DC converter according to the invention in a convenient functional grouping, whereby the present invention may be more readily understood. In the Figures, like numbers refer to like elements throughout.

Attention is initially directed to FIG. 1, which diagrammatically illustrates the overall architecture of a non-limiting, but preferred embodiment of a dual-mode, PWM/PFM DC-DC converter incorporating DC voltage offset correction in the voltage regulation path of the PWM error amplifier circuit in accordance with the present invention. As shown in FIG. 1, the converter includes a high side or upper power switching stage 10, and a low side or lower power switching stage 20. The high side power switching stage 10 includes an upper or high side power semiconductor switch (e.g., PMOSFET) 12 and an associated upper switch driver 14 therefor, while the low side power switching stage 20 includes a lower or low side power semiconductor switch (e.g., NMOSFET) 22 and an associated lower switch driver 24 therefor. The upper switch driver 14 has its output coupled to the control or gate input of the upper PMOSFET switch 12, while the lower switch driver 24 has its output coupled to the control or gate input of the lower NMOSFET switch 22. Switch drivers 14 and 24 are coupled to receive PWM- or PFM-based drive signals supplied by a switch driver control logic circuit 30.

The source-drain paths of MOSFET switches 12 and 22 are coupled in series between an upper power supply rail 13, to which a prescribed DC input voltage VIN is supplied, and a lower power supply rail 17, which is coupled to a prescribed reference potential (e.g., ground (GND)). The common or phase node 15 between the upper and lower MOSFET switches 12 and 22 is coupled by way of an output inductor 16 to an output node OUT, which provides a DC output voltage VO (e.g., 3.3 VDC) for powering a load, a device LOAD, such as the microprocessor of a notebook computer, shown as an output resistor 18 referenced to ground. An output capacitor 19 is coupled between the output node OUT and ground (GND).

The DC output voltage VO at the output node OUT is fed back via an output voltage feedback line 25 to a voltage divider 40, comprised of resistors 41 and 42, series-connected between feedback line 25 and GND. Voltage divider 40 has a voltage-dividing node 43 between resistors 41 and 42, from which a prescribed fraction or scaled version Vfb of the output voltage VO is provided. This scaled feedback voltage Vfb produced at voltage-dividing node 43 is coupled to a first input 51 of an integrating PWM error amplifier circuit 50, to a first input 61 of a DC offset correction circuit 60 (shown in detail in FIG. 3, to be described), to a first input 111 of a PFM comparator 110, and to a first input 121 of a PFM-PWM mode comparator 120.

As will be described, PWM error amplifier circuit 50 is operative, during PWM mode operation of the converter, to produce an error voltage representative of the difference between an integration of the scaled feedback voltage Vfb supplied to its first input 51 and a reference voltage Vref supplied to a second input 52 from a soft-start circuit 70, which is referenced to a precision voltage supplied by a bandgap reference 75, and receives an enable input EN, that is also supplied to switch driver control logic circuit 30.

DC offset correction circuit 60 (shown in detail in FIG. 3, to be described) is operative to modify, as necessary, the error voltage produced by PWM error amplifier circuit 50, so as to compensate for, or effectively "zero-out", any DC voltage offsets that may be present in the PWM error amplifier circuit's voltage regulation path, and thereby enable error amplifier circuit 50 to accurately regulate the converter's output voltage. In addition, when the converter transitions between PFM and PWM modes, DC offset correction circuit 60 establishes initial conditions of error amplifier circuit 50 that are effective to ensure that the output voltage at the beginning of a new "switched-to" PWM mode cycle is equal to output voltage at the end of the previous "switched-from" PFM mode cycle.

PFM comparator 110 is operative, during PFM mode, to generate a relatively narrow pulse-based PFM voltage waveform that is used by switch driver control logic circuit 30 to control the switching operations of upper and lower MOSFET switches 12 and 22 of the power switching stages 10 and 20. PFM-PWM mode comparator 120 monitors the output current and output voltage, and controllably places the converter in either PWM mode or PFM mode, in accordance with these monitored current and voltage parameters, as will be described.

The output 53 of PWM error amplifier circuit 50 is coupled to a second input 62 of DC offset correction circuit 60. DC offset correction circuit 60 produces a DC offset-corrected error current that is supplied to a first input 81 of a PWM comparator 80. PWM comparator 80 is operative, during PWM mode of operation of the converter, to generate a PWM voltage waveform at an output 83 thereof. To this end, a second input 82 of PWM comparator 80 is coupled to receive a ramp (or sawtooth) voltage waveform produced by a ramp voltage waveform generator 90, which is referenced to the input voltage VIN, and driven by a clock signal generated by a clock signal generator 100, operation of which is initiated by a synchronization signal SYNC.

The PWM voltage waveform generated by the PWM comparator 80 is coupled to a first input 131 of a PWM/PFM control logic circuit 130, the output 133 of which is coupled to switch driver control logic circuit 30. As will be described, during PWM mode, this PWM voltage waveform is used by switch driver control logic circuit 30 to generate complementary PWM voltage waveforms that control respective switching operations of upper and lower MOSFET switches 12 and 22 of the power switching stages 10 and 20, so as to provide a relatively high output current during continuous conduction mode (CCM) operation of the converter A second input 132 of PWM/PFM control logic circuit 130 is coupled to receive a PFM voltage waveform generated at the output 113 of PFM comparator 110. As described above, PFM comparator 110 has a second input 112 coupled to receive the reference voltage Vref from soft-start circuit 70 and is operative, during PFM mode, to generate a relatively narrow pulse-based PFM voltage waveform that is coupled (by way of PWM/PFM control logic circuit 130) to and used by switch driver control logic circuit 30 to control the switching operations of upper and lower MOSFET switches 12 and 22 of the power switching stages 10 and 20. This PFM waveform allows a relatively low or quiescent current to be generated by the converter for achieving discontinuous conduction mode (DCM) of regulation, as will be described.

During PFM mode, the on-duration of the upper MOSFET switch 12 is defined by the relatively narrow width of each PFM pulse, while the on-duration or length of time that the lower MOSFET switch 22 is turned-on corresponds to the length of time required for the output current from phase node 15 into inductor 16 to ramp down to zero from its peak value at the end of the PFM pulse. This on-duration of the lower MOSFET switch 22 extends between the termination of the PFM pulse and the point in time at which the output current reaches zero.

In order to determine when the output current reaches zero, the drain and source terminals of lower MOSFET 22 are coupled across respective non-inverting (+) and inverting (−) inputs 141 and 142 of a zero-current comparator or difference amplifier 140. With MOSFET 22 turned on to provide for ramping down of the output current, then, as long as current flow through output inductor 16 is positive, namely, flowing from ground (GND) through MOSFET 22 to phase node 15 and out of phase node 15 through inductor 16 to output node OUT, the converter is supplying energy to the load. In this case, the voltage at phase node 15 (the drain of MOSFET 22) will be less than ground (the voltage at the source of MOSFET 22). As a consequence, the voltage at the non-inverting (+) input 141 of difference amplifier 140 will be less than the voltage at its inverting (−) input 142, so that its output will have a first logical state, associated with positive current flow out of the converter and into the load.

On the other hand, when the ramping down current flow through MOSFET 22 and output inductor 16 reaches zero, the voltage across the source and drain terminals of MOSFET 22 will be at zero volts, causing the output 143 of zero-current comparator (difference amplifier) 140 to switch or change state. This change in state of the output of zero-current comparator 140 is used by the switch driver control logic circuit 30 to turn off MOSFET 22 and to provide an enable input to a narrow pulse-generating, monostable multivibrator (or one-shot) within the PFM comparator 110. This enable input to the one-shot allows it to be triggered, in response to the voltage Vfb applied to the input 111 of PFM comparator 110 dropping below the reference voltage Vref at the PFM comparator's input 111, so as to generate a new PFM pulse.

The output of the zero-current comparator 140 is also used by the PFM-PWM mode comparator 120 to control switch-over of converter operation from PWM mode to PFM mode. As will be described in detail below with reference to FIG. 2, if, during PWM mode, which is used to meet a relatively large (effectively continuous) load current demand (corresponding to continuous conduction mode (CCM)), the output current drops to zero and starts to go negative (indicating the onset of discontinuous current mode (DCM) of operation), logic circuitry within the PFM-PWM mode comparator 120 will generate a PWM-PFM mode switch-over signal, in response to detecting a change in state of the output of the zero-current comparator 140. The PWM/PFM control logic circuit 130 responds to this PWM-PFM mode switch-over signal, by changing the switching control signal coupling path therethrough from the PWM comparator 80 to the PFM comparator 110, thereby causing to the control logic circuit 30 to be controlled by the output of the PFM comparator 110, so that the converter switches from PWM mode to PFM mode.

To controllably switch converter operation from PFM mode to PWM mode, the PFM-PWM mode comparator 120 includes a difference amplifier (shown at 1210 in FIG. 2) that compares the scaled value Vfb of the fed-back output voltage VO coupled to its input 121 with a prescribed reference voltage that is slightly offset from or less than the reference voltage Vref coupled to a second input 122 thereof. If, during PFM mode, the powered device transitions from quiescent or sleep mode to active mode, its output current demand will increase—causing the frequency of the PFM waveform to increase for the purpose of supplying more load current. Eventually, the output current being supplied by the converter during PFM mode will reach a maximum value (one-half of peak), beyond which point, the converter's output voltage VO will begin to collapse.

When this happens, the scaled value Vfb at input 121 of PFM-PWM mode comparator 120 will fall below the prescribed reference voltage, causing the output of the difference amplifier to change state. In response thereto, the logic circuitry within the PFM-PWM mode comparator will generate a PFM-PWM mode change output, which is coupled to the PWM/PFM control logic circuit 130. The PWM/PFM control logic circuit 130 responds by changing the switching control signal coupling path therethrough from the PFM comparator 110 to the PWM comparator 80, and thereby causes the converter to switch from PFM mode to PWM mode.

Figure 2:
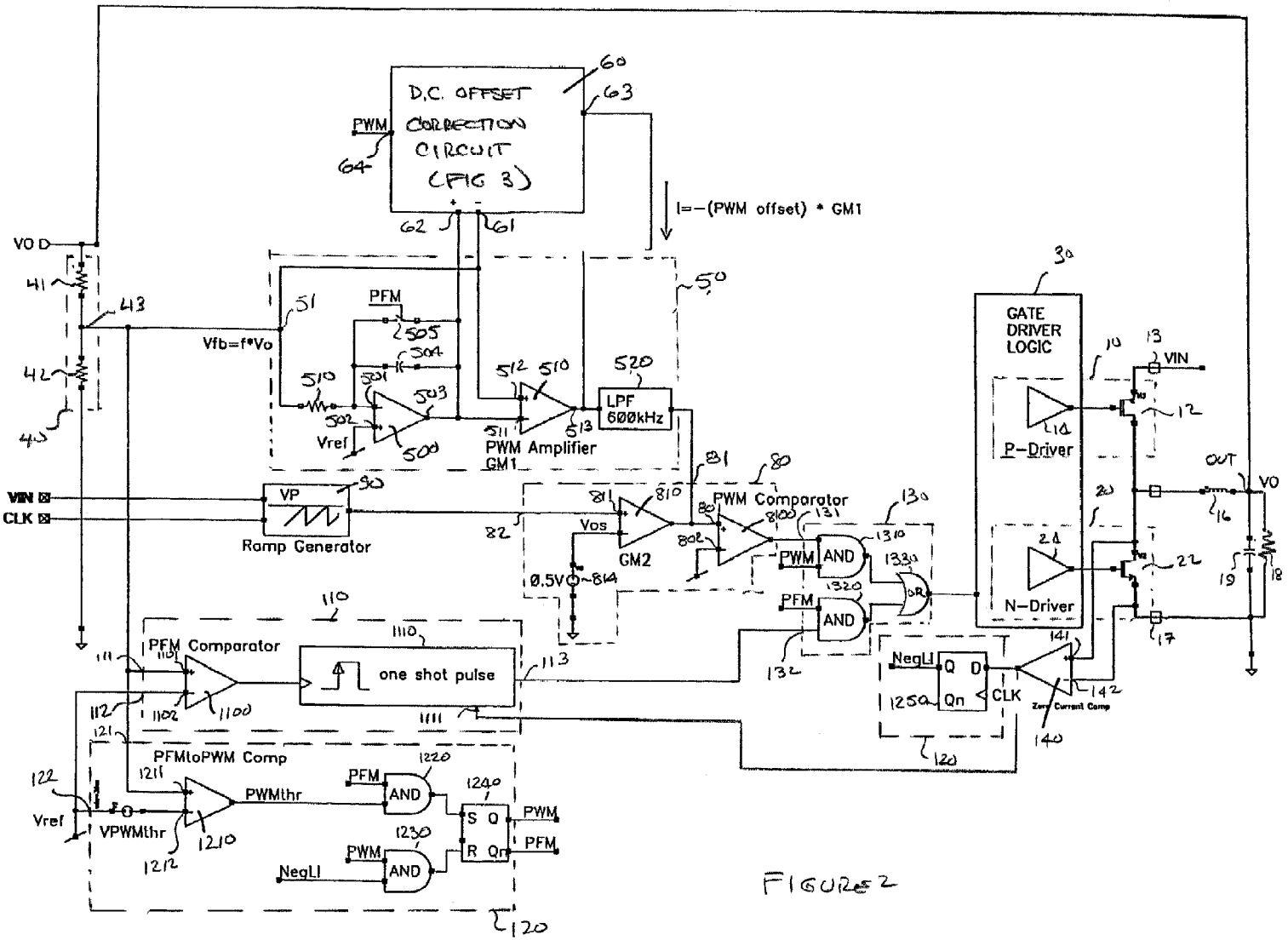
FIG. 2 is a more detailed diagram of the PWM mode- and PFM mode-based regulation circuits of the dual-mode, PWM/PFM DC-DC converter of FIG. 1.

Attention is now directed to FIG. 2, which is a more detailed diagram of the PWM mode- and PFM mode-based regulation circuits of the DC offset voltage-compensated, dual-mode, PWM/PFM DC-DC converter architecture of FIG. 1. As shown in FIG. 2, the integrating PWM error amplifier circuit 50 includes an operational amplifier (OP AMP) 500, which is configured as an integrating error amplifier. To this end, OP AMP 500 has a first, inverting (−) input 501 thereof coupled through an input resistor 510 to the first input 51 of PWM error amplifier circuit 50, to which the scaled feedback voltage Vfb is coupled from voltage dividing node 43 voltage divider 40. Voltage dividing node 43 is further coupled to the non-inverting (+) input 61 of DC offset correction circuit 60 (shown in detail in FIG. 3, described below). A second, non-inverting (+) input 502 of OP AMP 500 is coupled to receive the reference voltage Vref. A capacitor 504 is coupled between the inverting (−) input 501 and the output 503 of OP AMP 500.

A controlled switch 505 is coupled across the capacitor 504, with the open or closed condition of switch 505 being governed by the logical value of a PFM output of the PFM-PWM mode comparator 120. During PFM mode, the logical value of this PFM output is high, and switch 505 is closed—shorting capacitor 504—so that there is no voltage drop thereacross. This serves to ensure that, at the time of transitioning from PFM mode to PWM mode, capacitor 504 will be discharged. At a transition or switch-over from PFM to PWM mode, the logical value of the PFM output of PFM-PWM mode comparator 120 changes from high to low, so that switch 505 is opened, and remains open during PWM mode. This allows capacitor 504 to be charged, by operation of the DC offset correction circuit 60, from its discharged or shorted condition, to an initial value of DC offset-compensating voltage that is effective to compensate for DC voltage offsets that may be present in the voltage regulation path, so as to enable the PWM error amplifier circuit to accurately regulate the converter's output voltage. Thereafter, at a transition or switch-over from PWM mode back to PFM mode, the logical value of the PFM output of PFM-PWM mode comparator 120 changes from low to high, so that switch 505 is again closed, so as to maintain capacitor 504 discharged.

The output 503 of OP AMP 500 is coupled to the non-inverting (+) input 62 of DC offset correction circuit 60, and to a first, inverting (−) input 511 of transconductance amplifier 510. A second, non-inverting (+) input 512 of transconductance amplifier 510 is coupled to the inverting (−) input 61 of offset correction circuit 60, and to the input 51 of PWM error amplifier circuit 50. The output 513 of transconductance amplifier 510 is coupled to a current output 63 of offset correction circuit 60 and, via a low pass filter (LPF) 520, to an input 81 of PWM comparator 80, which is coupled to a first, non-inverting (+) input 801 of a transimpedance amplifier 800 therein. Transimpedance amplifier 800 has a second, inverting (−) input 802 coupled to a reference (e.g., ground).

During PWM mode, adjustment of the DC offset correction output of the DC offset correction circuit 60 is controlled in accordance with (low-to-high) transitions in a PWM input 64 from a PWM output of the PFM-PWM mode comparator 120. During PFM mode, the logical value of its PWM input from PFM-PWM mode comparator 120 is low, so that the operation of DC offset correction circuit 60 is effectively disabled. Instead, DC offset correction circuit 60 continues to store the last value of a DC offset-correction current that it had been supplying at the end of the previous PWM mode cycle.

As noted above, when operative (during PWM mode), DC offset correction circuit 60 controllably modifies, as necessary, the error voltage produced by PWM error amplifier circuit 50, so as to compensate for, or effectively "zero-out", any DC voltage offsets that may be present in the PWM error amplifier circuit's voltage regulation path. In addition, when converter output voltage regulation transitions between PFM and PWM modes, DC offset correction circuit 60 establishes initial conditions of error amplifier circuit 50 that are effective to ensure that the output voltage at the beginning of a new "switched-to" PWM mode cycle is equal to output voltage at the end of the previous "switched-from" PFM mode cycle.

For this purpose, during PWM mode, DC offset correction circuit 60 monitors, by way of its inputs 61 and 62, the voltage across the input and output of the error amplifier 500. In response to this voltage, DC offset correction circuit 50 generates a current at its output 63, which is coupled to the output 513 of transconductance amplifier 510. Through the inherent transfer function of transconductance amplifier 510, this current at amplifier output 513 is reflected back as a voltage across the amplifier's inputs 511 and 512, so that it may be impressed across capacitor 504. As a result, the reflected-back voltage effectively compensates for, or "zeroes-out", any accumulated DC voltage offsets that may be present in the PWM mode error amplifier circuit's voltage regulation path, so that the enable error amplifier circuit is able to accurately regulate the converter's output voltage VO.

Moreover—and a key feature of the invention, when the converter's output voltage regulation transitions from PFM mode to PWM mode, DC offset correction circuit 60 generates an initial value of offset-correction current at its output 63. This initial value of offset-correction current corresponds to a stored value of correction current that it had been supplying at end of the previous PWM mode cycle. As parameters of the circuitry of the converter change relatively slowly in comparison with the rate of switch-over between PFM mode and PWM mode cycles, this stored value of offset-correction current will effectively provide the necessary DC offset correction voltage for a 'glitch-less' transition (namely, introducing no DC voltage offset into the output voltage VO) between PFM and PWM modes.

It may be noted that the initial default mode of operation of the converter is always PWM mode. This serves to allow the DC offset correction loop to gradually ramp up and stabilize from an initial zero offset correction condition to whatever correction voltage is required. Thereafter, whenever the converter transitions from PWM mode to PFM mode, DC offset correction circuit 60 stores information representative of the value of offset-correction current that it had been supplying at end of that PWM mode cycle. As a result, when the converter next transitions from PFM mode to PWM mode, DC offset correction circuit 60 is able to supply an initial value of offset-correction current that is reflected back by transconductance amplifier 510 across error amplifier 500 as a DC offset correction voltage that effectively compensates for, or "zeroes-out", any accumulated DC voltage offsets that may be present in the PWM error amplifier circuit's voltage regulation path.

Figure 3:
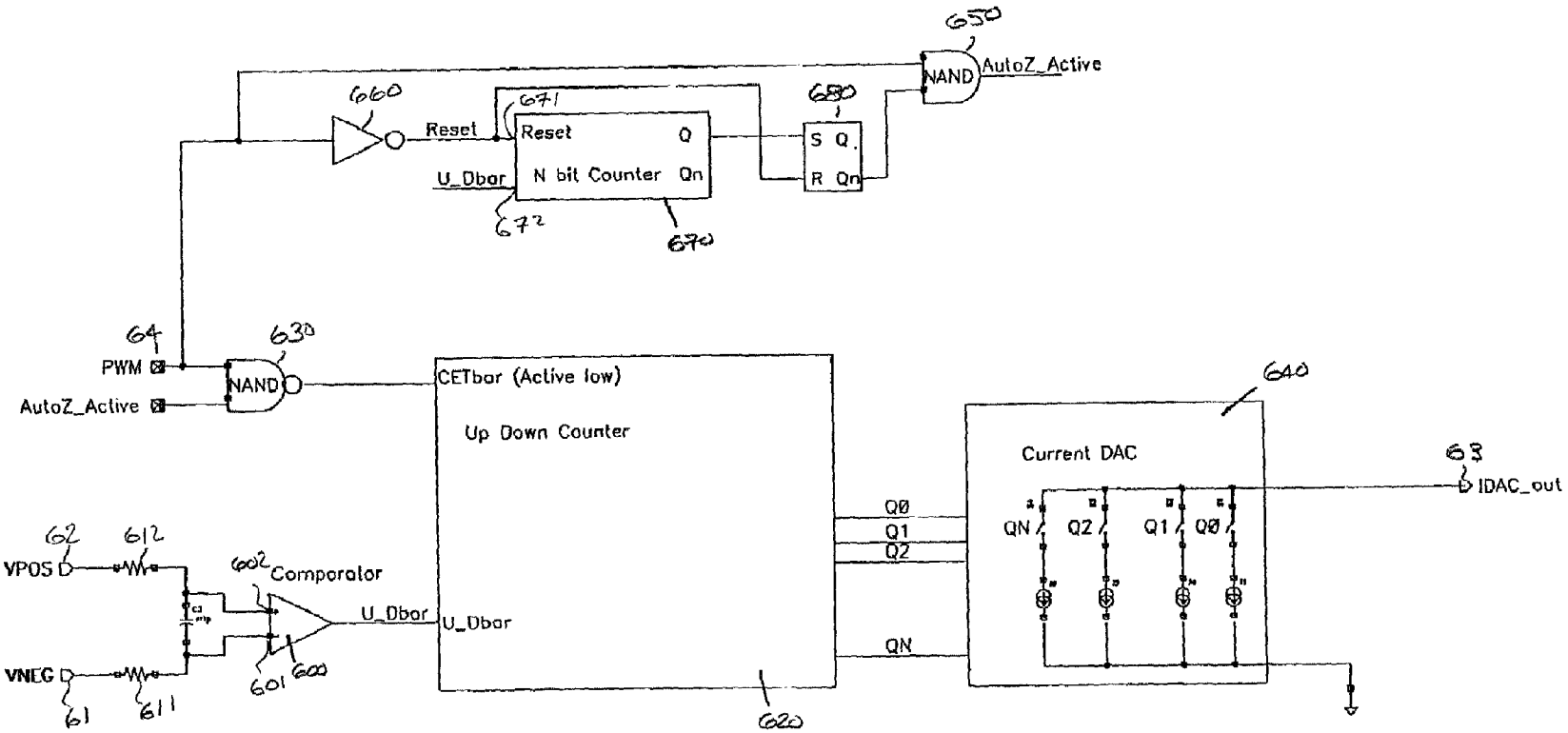
FIG. 3 is a detailed diagrammatic illustration of the DC offset correction circuit of the dual-mode, PWM/PFM DC-DC converter shown in FIGS. 1 and 2.

A non-limiting example of an implementation of the DC offset correction circuit 60 is diagrammatically illustrated in FIG. 3 as comprising a differential amplifier or comparator 600 having respective inputs 601 and 602 thereof coupled through associated input resistors 611 and 612 to the VNEG and VPOS inputs 61 and 62 of the DC offset correction circuit 60. The output 603 of comparator 600 supplies an up/down count control input U_Dbar to an up/down (digital) counter 620. The clocking operation of up/down counter 620 is controlled by the output of a NAND gate 630, to which the PWM output of the PFM-PWM mode comparator 120 is coupled. Transitions in this PWM output are used to clock the up/down counter. NAND gate 630 is controllably enabled to pass these PWM transitions by a first logical state of the output (AutoZ_Active) of a NAND gate 650, and has its output coupled to a CETbar input of up/down counter 620. Namely, the output of NAND gate 630 provides count signals to the CETbar input of up/down counter 620 in accordance with successive transitions in the operation of the converter from PFM to PWM mode.

As a consequence, up/down counter 620 will be successively incremented or decremented, as determined by the state of the output U_Dbar of comparator 602 which, in turn, depends upon the polarity of the voltage across the inputs 511 and 512 of transconductance amplifier 510. When NAND gate 630 is disabled by a second logical stage of the output (AutoZ_Active) of a NAND gate 650, the CETbar input of up/down counter 620 cannot be clocked by the PWM signal, so as to prevent the counter from being further incremented or decremented, and counter 620 stores its accumulated count value.

The Q0-QN outputs of up/down counter 620 are coupled to respective stages of a current mode digital-analog converter (DAC) 640, which generates a DC offset correction current at output 63 representative of the accumulated count value within up/down counter 620. As described above, this correction current is supplied to the output 513 of transconductance amplifier 510 and reflected back thereby as a voltage across the amplifier's inputs 511 and 512, so that it may be impressed across capacitor 504 of error amplifier 500, and thereby compensate for, or "zeroes-out", any accumulated DC voltage offsets that may be present in the PWM error amplifier circuit's voltage regulation path, so that the enable error amplifier circuit is able to accurately regulate the converter's output voltage.

In order to pass the PWM transitions to the clock input of the up/down counter 620, NAND gate 630 has a first input 631 coupled to the PWM input 64, which receives the PWM output from PFM-PWM mode comparator 120. A second 'enabling' input 632 of NAND gate 630 is coupled to the output (AutoZ_Active) of NAND gate 650. NAND gate 650 has a first input 651 coupled to the PWM input 64, which is further coupled through an inverter 660 to a reset input 671 of an N-bit counter 670, and to the reset input R of a set/reset latch (flip-flop) 680. NAND gate 650 has a second input 652 coupled to the QBAR output of latch 680, the set input S of which is coupled to the Q output of the N-bit counter 670, which is clocked by the U_Dbar output of comparator 600. N-bit counter 670 is used to controllably enable clocking of the up/down counter 620 by successive transitions from PFM mode to PWM mode.

In operation, when the converter transitions from PFM mode to PWM mode, the PWM output from PFM-PWM mode comparator 120 transitions from low to high. If NAND gate 630 is enabled, this transition will clock up/down counter 620. Whether up/down counter is incremented or decremented will depend upon the state of the output of differential amplifier 600, which monitors the voltage across the VNEG and VPOS inputs 61 and 62 (corresponding to the voltage across the error amplifier 500) and provides either a count-up or count-down representative input to the U_Dbar input of up/down counter 620, so that counter 620 will be clocked up or down at successive transitions in the operation of the converter from PFM to PWM mode. The count value in up/down counter 620 is converted into the DC offset correction current by current mode DAC 640 for application to the output 513 of transconductance amplifier 510 in the error amplifier correction loop. Once the injected offset reaches zero, comparator 600 will toggle up and down about the least significant bit (LSB) of the contents of the up/down counter 620, and the digital offset value is stored.

In parallel with the operation of up/down counter 620, the N-bit counter 670 counts a prescribed number of times that the count direction control input to the up/down counter 620 switches back and forth between a count-up and count-down condition (as determined by the logical state of the output of the differential amplifier 600, which effectively monitors the polarity of the voltage differential between the scaled output voltage and the output of the error amplifier). This serves to handle the case where correction is to be continuous. In such a case, it is necessary to determine a mimimum time in forced PWM mode. This insures that when the system transitions to PWM mode, it will remain in PWM mode until sufficient time is allowed for the system to settle. Until such settling time has transpired, the system is not allowed to transition back to PWM mode. Auto correction may be allowed any time the controller is in PWM mode and must be enabled in PWM mode. Once N-bit counter 670 counts up to a prescribed count value (e.g., seven) it will set latch 680. With latch 680 set, the output (AutoZ_Active) of NAND gate 650 will change state, disabling NAND gate 630 and preventing further clocking of up/down counter 620 by transitions in the PWM output of PFM-PWM mode comparator 120.

As described above, and referring again to FIG. 2, the DC offset corrected output of error amplifier circuit 50, as supplied by transconductance amplifier 510, is a current, which is supplied to a first, non-inverting (+) input 801 of a transimpedance amplifier 800 within PWM comparator 80. Input 801 is also coupled to the current output of a transconductance amplifier 810, which has a first, non-inverting (+) input 811 (which serves as the PWM comparator input 82) coupled to the output of the ramp generator 90, and a second, inverting (−) input 812 thereof coupled to a prescribed reference voltage 814.

Transconductance amplifier 810 generates a PWM current in accordance with a difference between the ramp voltage output of ramp generator 90 and the reference voltage 814. This PWM current is summed with the error current from error amplifier circuit 50 at input 801 of transimpedance amplifier 800 and compared with a voltage at its inverting (−) input 802. The resulting PWM voltage waveform produced by transimpedance amplifier 800 is coupled to a first input of an AND gate 1310 within PWM/PFM control logic circuit 130, a second input of which is coupled to receive the PWM (Q) output of a set/reset flip-flop (latch) 1240 within PFM-PWM mode comparator 120. As will be described the state of latch 1240 determines whether the converter is in PWM mode or PFM mode.

The output of AND gate 1310 is coupled to a first input of an OR gate 1330, the output of which serves as the switching signal input for control circuit 30. As described above, during PWM mode, the PWM output of PFM-PWM mode comparator 120 is asserted high. As a result, during PWM mode, AND gate 1310 is enabled, so as to couple the PWM voltage waveform produced by transimpedance amplifier 800 to OR gate 1330 for application to control circuit 30. As pointed out above, this PWM voltage waveform is used by switch driver control logic circuit 30 to generate complementary PWM voltage waveforms that control respective switching operations of upper and lower MOSFET switches 12 and 22 of the power switching stages 10 and 20, so as to provide a relatively high output current during continuous conduction mode (CCM) operation of the converter.

PWM/PFM control logic circuit 130 also includes an AND gate 1320, a first input to which is coupled to receive the PFM (QBAR) output of latch 1240 within PFM-PWM mode comparator 120, and a second input to which is coupled to the output of a one-shot pulse generator 1110 within PFM comparator 110. The input of one-shot 1110 is coupled to the output of a comparator 1100, which has a first input 1101 coupled to PWM comparator input 111, to which the scaled output voltage Vfb is supplied, and a second input 1102, to which the reference voltage Vref is supplied from soft-start circuit 70. One-shot 1110 has an enable input 1111 thereof coupled to the output of zero-current comparator 140.

As pointed out above, during PFM mode, the one-shot of PWM comparator 110 is not enabled until the ramping down current flow through MOSFET 22 and output inductor 16 reaches zero, which causes the voltage across the source and drain terminals of MOSFET 22 to be at zero volts, so that the output 143 of zero-current comparator 140 will change state. This change in state of the output of zero-current comparator 140 allows the one-shot 1110 to be triggered so as to generate a new PFM pulse, in response to the voltage Vfb applied to input 1101 of comparator 1100 dropping below the reference voltage Vref at its input 1102. The PFM voltage waveform is coupled by way of AND gate 1320 of PWM/PFM control logic circuit 130 to switch driver control logic circuit 30 for controlling the switching operations of upper and lower MOSFET switches 12 and 22 of the power switching stages 10 and 20, so as to enable a relatively low or quiescent current to be generated by the converter for achieving discontinuous conduction mode (DCM) of regulation.

PFM-PWM mode comparator 120 monitors the output current and output voltage, and controllably places the converter in either PWM mode or PFM mode, in accordance with these monitored current and voltage parameters. In order to determine whether the converter should (switch from PFM mode and) operate in PWM mode, comparator 120 includes a voltage comparator or difference amplifier 1210, which has a first, non-inverting (+) input 1211 coupled to comparator input 121, and a second, inverting (−) input 1212 coupled to comparator input 122. As such, difference amplifier 1210 compares the scaled value Vfb of the fed-back output voltage VO coupled to input 1211 with a prescribed reference voltage that is slightly offset from or less than the reference voltage Vref coupled to input 1212.

The output of difference amplifier 1210 is coupled to one input of an AND gate 1220, a second input of which is coupled to receive the PFM (QBAR) output of latch 1240. The output of AND gate 1220 is coupled to the set input of latch 1240. The reset input of latch 1240 is coupled to the output of an AND gate 1230, one input of which is coupled receive the PWM (Q) output of latch 1240, and a second input of which is coupled to the NEGli (Q) output of a clocked flip-flop 1250, the D input of which is coupled to the output of zero-current comparator 140.

As described above, the converter operates in PFM mode when the current demand of the load is relatively light (as is the case when the powered device is in quiescent or sleep mode of operation). However, when the powered device transitions from quiescent or sleep mode to active mode, its output current demand will increase—causing the frequency of pulses of the PFM waveform produced by one-shot 1110 of PWM comparator 110 to increase. Eventually, the output current will reach a maximum value (one-half of peak), beyond which point, the converter's output voltage VO begins to collapse. When this happens, the scaled value Vfb at input 1211 of difference amplifier 1210 will drop below the prescribed reference voltage applied to its input 1212, causing the output of difference amplifier 1210 to change state (go high).

In response thereto, the output of AND gate 1220 will be asserted high—setting latch 1240. With latch 1240 set, its Q or PWM output is asserted high, while its QBAR of PFM output is asserted low, so as to place the converter in PWM mode. In particular, the high PWM output enables the operation of DC offset correction circuit 60 and AND gate 1310 of PWM/PFM control logic circuit 130, so that switching control signals for the switch driver control logic circuit 30, which had been supplied by PFM comparator 110 during PFM mode, are now supplied by PWM comparator 80. In addition, as described above, with the QBAR (PFM) output of latch 1240 going low, capacitor-shorting switch 505 is opened, so as to allow the integrating capacitor 504 across error amplifier 500 to be charged by DC offset correction circuit 60 to an initial value of DC offset-compensating voltage that is effective to compensate for DC voltage offsets that may be present in the voltage regulation path, thereby achieving a 'glitch-less' transition from PFM mode to PWM mode.

Once the converter has transitioned to and is operating in PWM mode, the PWM voltage waveform is adjusted, as necessary, by error amplifier circuit 50, to meet the power demand of the load, and will continue to do so (operating in continuous conduction mode), as long as the power demand is relatively large. However, when the load current demand is reduced substantially (as in the case of the powered device going into quiescent or sleep mode), for efficient regulation, the converter will transition to PFM mode. To determine when this should happen, the PFM-PWM mode comparator's AND gate 1230 monitors the Q (NEGLi) output of flip-flop 1250. If, during PWM mode, the ramping down portion of the output current through MOSFET 22 and output inductor 16 drops to zero and starts to go negative (indicating the onset of discontinuous current mode (DCM) of operation), the output of zero-current comparator 140 will switch from low to high, which is then latched into flip-flop 1250, causing its Q (NEGLi) output to go high. This, in turn, causes the output of AND gate 1230 to be asserted high, thereby resetting flip-flop 1240. With flip-flop 1240 reset, its QBAR (PFM) output is asserted high, while its Q (PWM) output is asserted low, so as to place the converter in PFM mode.

In particular, the low PWM output disables the operation of DC offset correction circuit 60 and AND gate 1310 of PWM/PFM control logic circuit 130, so that switching control signals for the switch driver control logic circuit 30, which had been supplied by PWM comparator 80 during PWM mode, are now supplied by PFM comparator 110. In addition, with the QBAR (PFM) output of latch 1240 going high, capacitor-shorting switch 505 is closed, so as to discharge capacitor 504 across error amplifier 500, in preparation for being recharged an initial value of DC offset-compensating voltage by DC offset correction circuit 60 at the next transition from PFM mode to PWM mode.

FIGS. 4A-4E, 5A-5E, 6A-6E, 7A-7E, 8A-8E and 9A-9D depict respective sets of voltage and current waveforms associated with the operation of the dual-mode, PWM/PFM DC-DC converter of FIGS. 1-3. In particular, the waveform diagrams of FIGS. 4A-4E are associated with a simulation of the operation of the converter of FIGS. 1-3, with induced offset and correction cycle, while FIGS. 5A-5E are enlarged versions of the waveform diagrams of FIGS. 4A-4E.

Figures 4A, 4B, 4C, 4D, 4E:
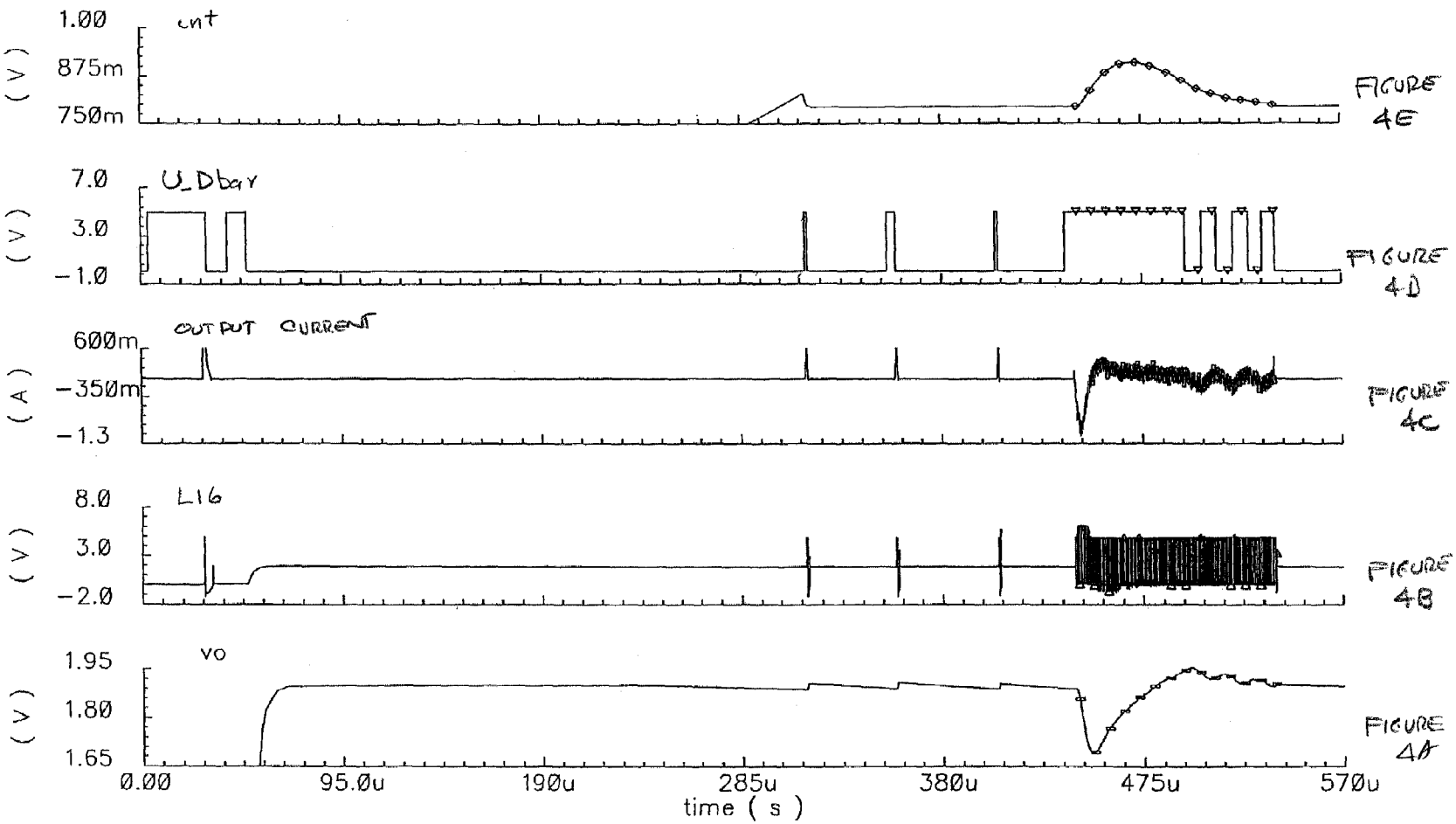
FIGS. 4A-4E, 5A-5E, 6A-6E, 7A-7E, 8A-8E and 9A-9D depict respective sets of voltage and current waveforms associated with the operation of the dual-mode, PWM/PFM DC-DC converter of FIGS. 1-3.
Figures 5A, 5B, 5C, 5D, 5E:
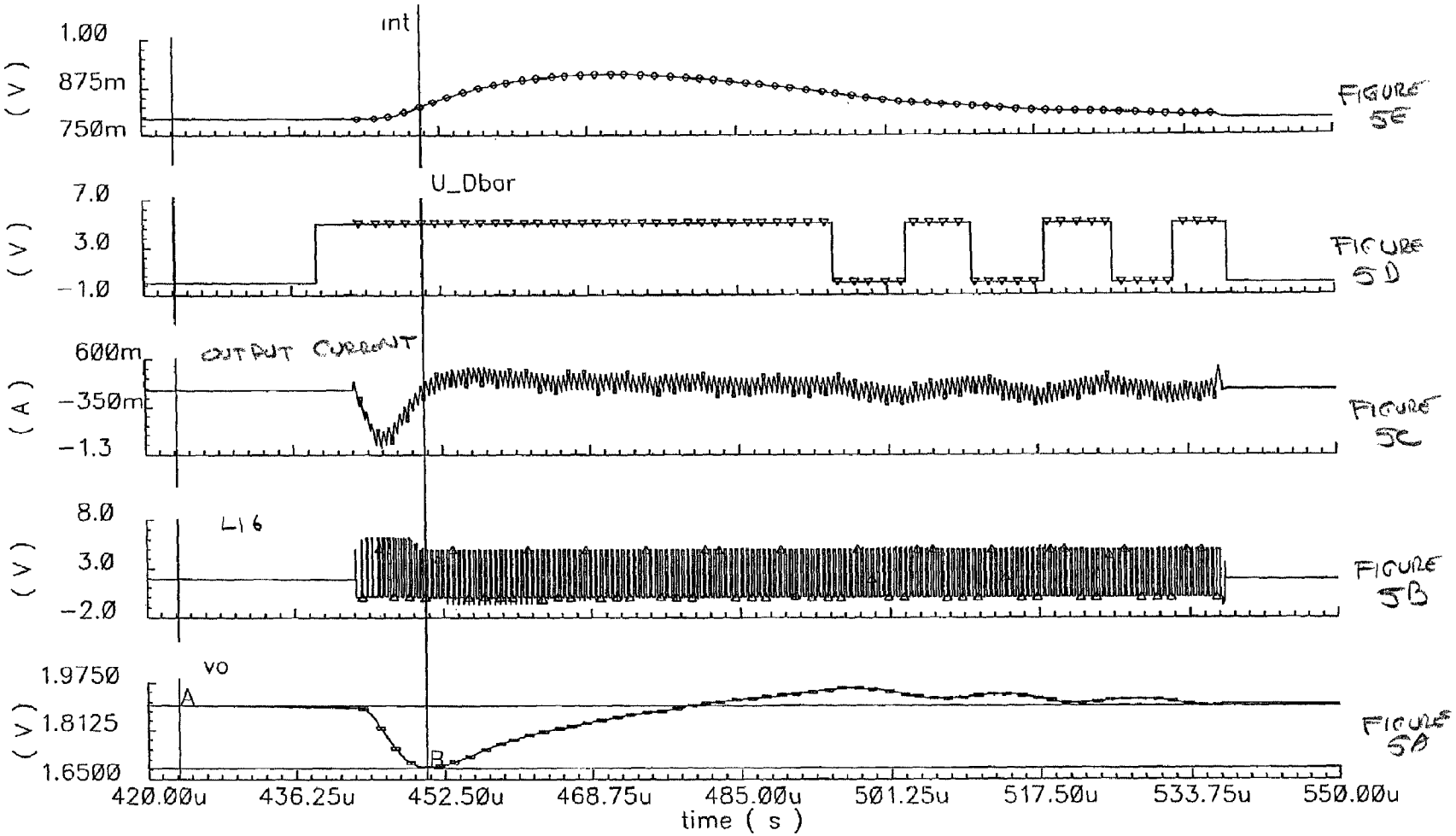
Figures 6A, 6B, 6C, 6D, 6E:
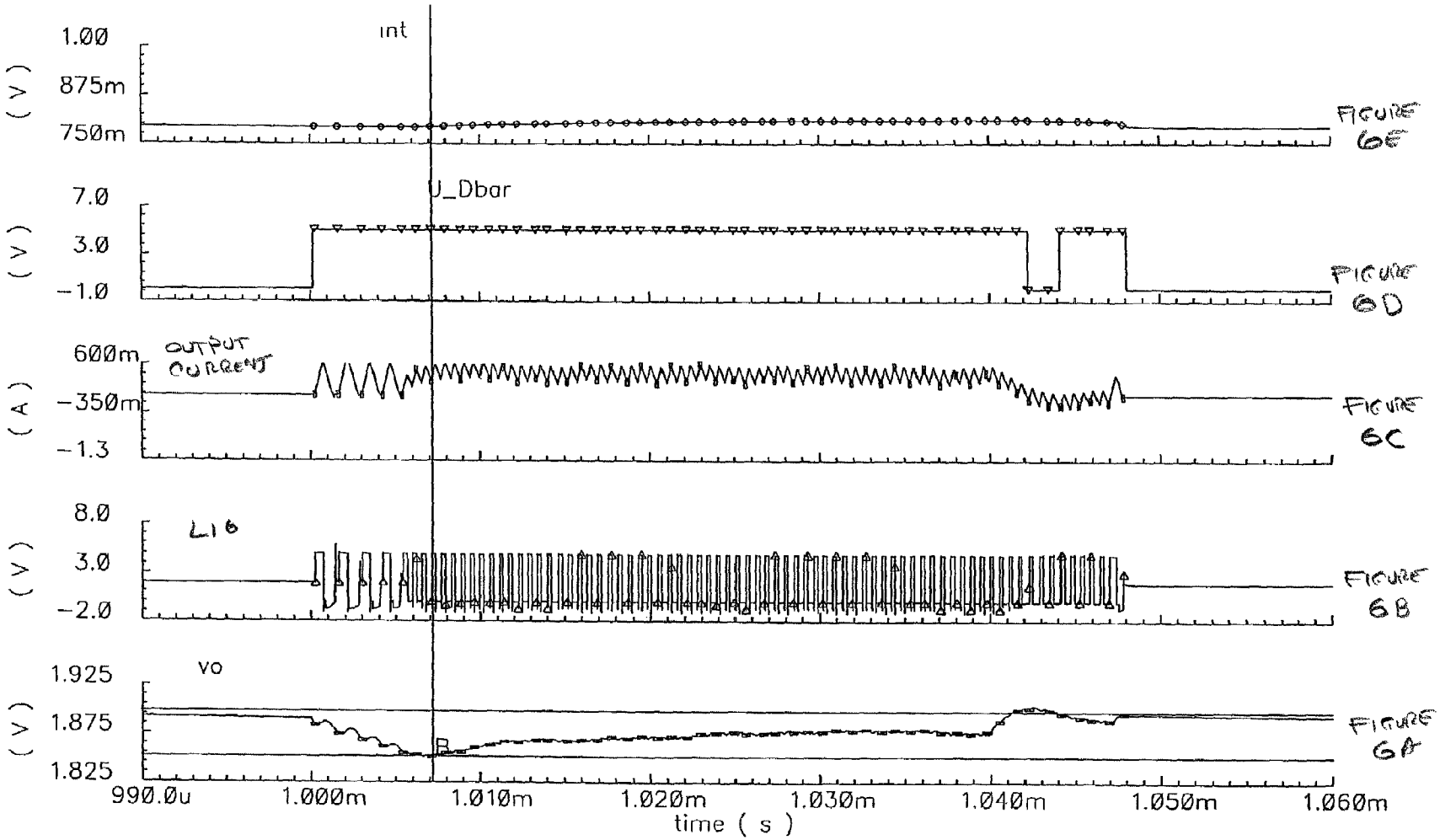
Figures 7A, 7B, 7C, 7D, 7E:
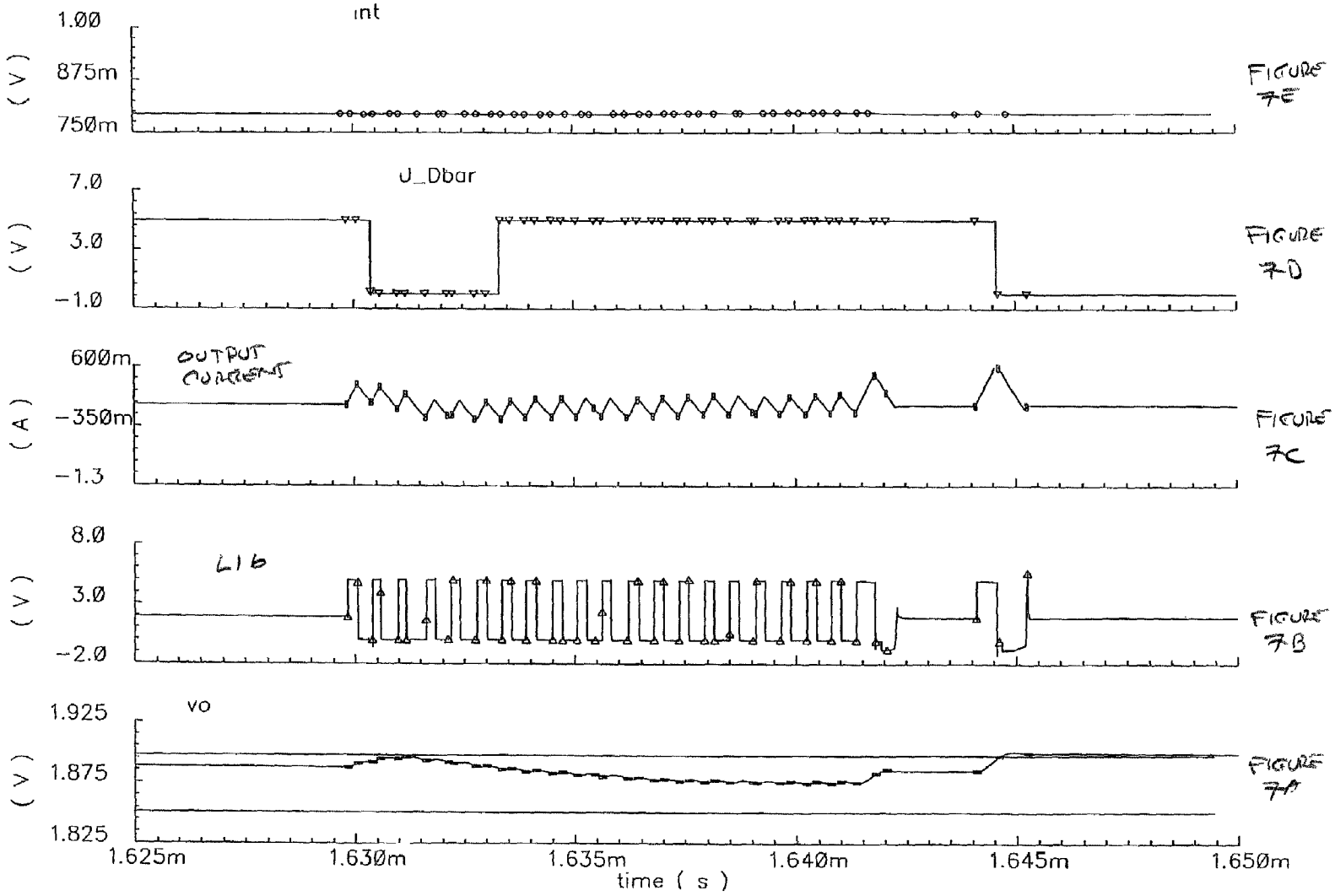
Figures 8A, 8B, 8C, 8D, 8E:
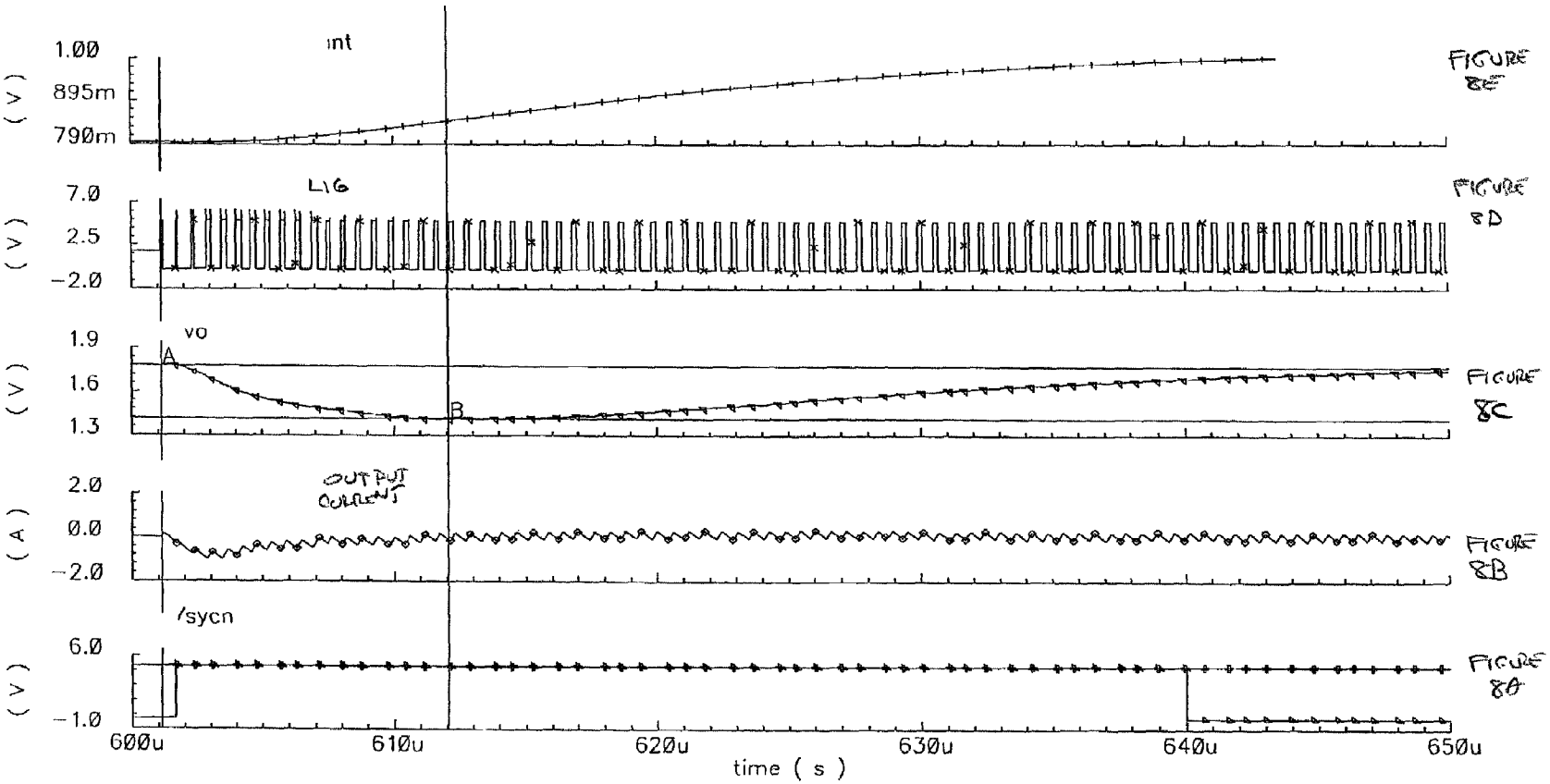
Figures 9A, 9B, 9C, 9D:
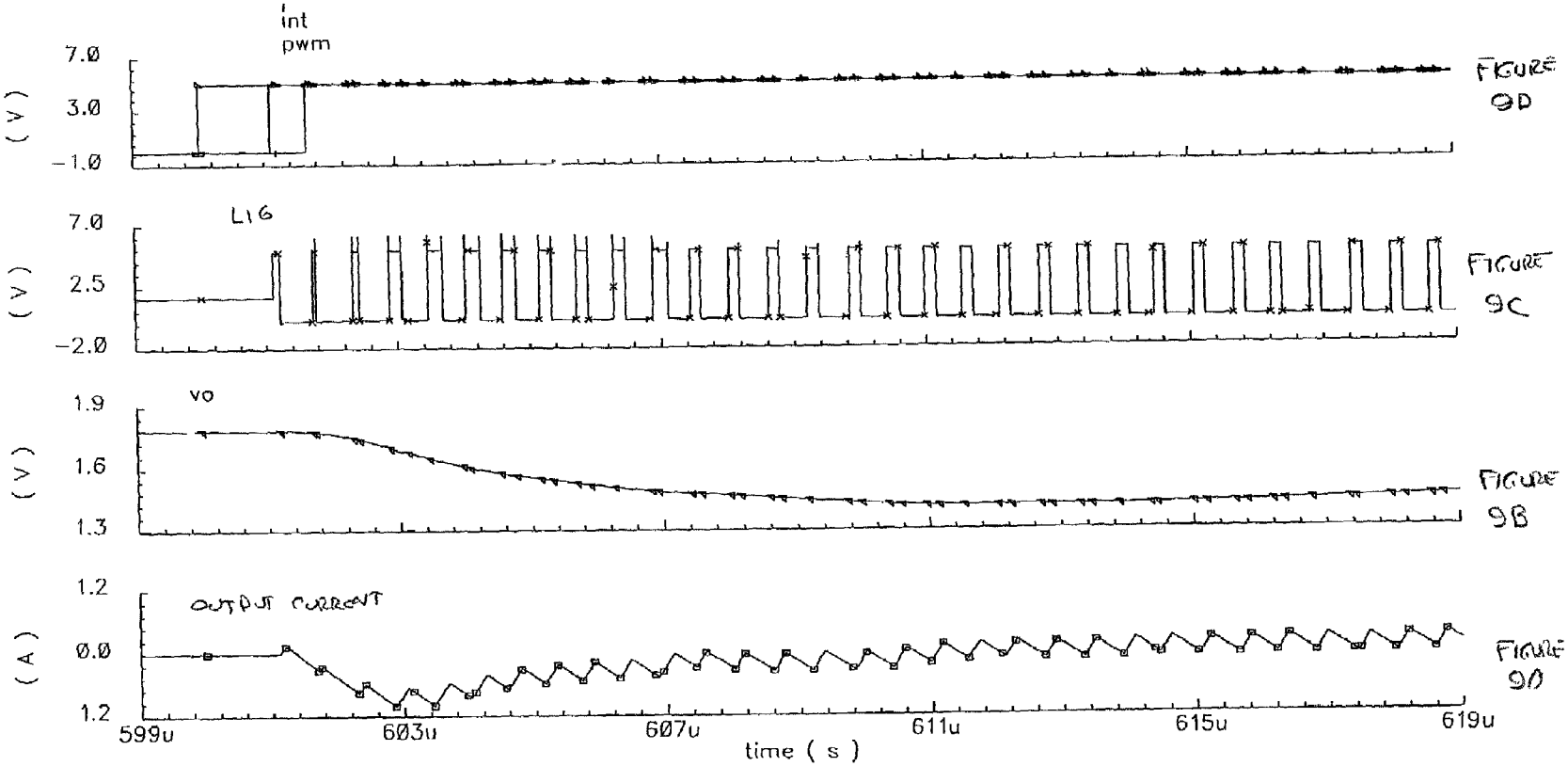

The initial time interval from 0 to 380 microseconds corresponds to system start-up. For simulation purposes, the output voltage VO was pulled up to 1.5 volts. At a subsequent time on the order of 450 microseconds, the output voltage VO is shown in FIGS. 4A and 5A as having a negative-going anomaly or 'glitch', followed by a recovery period and what appears to be a slight oscillation until stabilized at a time on the order of 540 microseconds. This represents the operation of the DC offset correction circuit correcting the offset, while in PWM mode.

FIGS. 4B and 5B show the voltage at the phase node 15 at a time between 450 to 560 microseconds, associated with PWM mode of operation. FIGS. 4C and 5C show the output current with an oscillation when in a correction cycle. FIGS. 4D and 5D show the U_Dbar voltage input to up/down counter 620. FIGS. 4E and 5E show the integrated voltage for the error amplifier, which increases to 900 mV and then decreases to 800 mV, indicating that the output of the integrator is where it should be, with a normal zero offset, so that when capacitor 504 is shorted by the closure of switch 505, the reference is 800 mV. In PWM mode, under normal operation, that voltage is on the order of 800 mV, so that when switching between PFM and PWM modes, the initial conditions will be the same, indicating that the offset-correcting output current supplied by the DC offset correction circuit will be reflected by transconductance amplifier 510 into the DC value of the integrating error amplifier 500.

The waveform diagrams of FIGS. 6A-6E show variations in the same electrical parameters as in FIGS. 4A-4E and 5A-5E, but illustrate signal levels for a simulation of a load-induced, PFM-PWM transition, with induced offset after correction cycle, while the waveform diagrams of FIGS. 7A-7E show variations in the same electrical parameters as in FIGS. 4A-4E and 5A-5E, but illustrate signal levels for a simulation of a sync-induced PFM-PWM transition, with induced offset after correction cycle. As shown in the FIGS. 6A-6E and 7A-7E, the output voltage VO reflects a positive voltage with very little distortion, after the offset has been corrected and, except for the dynamic loading into the transient, there is no operating current induced into the transient. In other words, the relatively large operating droop and increase in current have been removed by the DC offset correction, so that the operating conditions are the same. The waveform diagrams of FIGS. 8A-8E and enlarged views of FIGS. 9A-9D illustrate signal levels for a simulation with a 300 mV-induced PWM amplifier offset.

As will be appreciated from the foregoing description, the undesirable anomaly or glitch that can occur in the regulated DC output voltage of a dual-mode PWM/PFM DC-DC converter, when switching between PFM and PMW modes, is successfully obviated in accordance with the present invention by augmenting the voltage regulation path through the converter's PWM error amplifier with a DC voltage offset correction mechanism. This mechanism compensates for or "zeros-out" DC voltage offsets that may be present in the voltage regulation path, thereby enabling the error amplifier to accurately regulate the converter's output voltage and, when the converter transitions between PFM and PWM modes, establishes initial conditions of the error amplifier that effectively ensure that the converter's regulated output voltage at the beginning of a new "switched-to" PWM mode cycle is DC offset-free—being equal to the regulated output voltage at the end of the previous "switched-from" PFM mode cycle, as intended.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A multi-mode DC-DC converter for supplying a regulated DC output voltage to a load comprising:

an output power switching stage having upper and lower power switches coupled between an input voltage terminal and a reference voltage terminal and having a common node therebetween coupled by way of an output inductor to an output node from which said regulated DC output voltage is supplied;

a control circuit for controlling switching of said upper and lower power switches of said output power switching stage for respectively different modes of operation of said multi-mode DC-DC converter in accordance with respectively different switching control signals applied thereto;

a plurality of switching control signal generators, which are operative to generate said respectively different switching control signals, in response to which said control circuit controls switching of said upper and lower power switches of said output power switching stage during said respectively different modes of operation of said multi-mode DC-DC converter; and a mode transition control circuit, coupled with said plurality of switching control signal generators, and being operative to prevent an anomaly in said DC output voltage at a transition between respectively different modes of operation of said multi-mode DC-DC converter.

2. The multi-mode DC-DC converter according to claim 1, wherein said mode transition control circuit is operative to prevent the occurrence of a DC voltage offset in said DC output voltage at said transition between respectively different modes of operation of said multi-mode DC-DC converter.

3. The multi-mode DC-DC converter according to claim 1, wherein said respectively different modes of operation of said multi-mode DC-DC converter correspond to continuous conduction mode (CCM) operation and discontinuous conduction mode (DCM) operation, and wherein said mode transition control circuit is operative to prevent the occurrence of a DC voltage offset in said DC output voltage at a transition from DCM mode operation to CCM mode operation of said multi-mode DC-DC converter.

4. The multi-mode DC-DC converter according to claim 1, wherein said respectively different modes of operation of said multi-mode DC-DC converter correspond to pulse width modulation (PWM) mode and pulse frequency modulation (PFM) mode, and wherein said mode transition control circuit is operative to prevent the occurrence of a DC voltage offset in said DC output voltage at a transition from PFM mode operation to PWM mode operation of said multi-mode DC-DC converter.

5. The multi-mode DC-DC converter according to claim 4, wherein said plurality of switching control signal generators include a PWM waveform generator which is operative to control the pulse width of a PWM waveform supplied thereby to said control circuit in accordance with a prescribed relationship between said regulated DC output voltage and a reference voltage, and a PFM waveform generator which is operative to control the pulse frequency of said PFM waveform supplied thereby to said control circuit in accordance with a prescribed relationship between said regulated DC output voltage and said reference voltage; and wherein said mode transition control circuit is operative to establish an electrical parameter of said PWM waveform generator that is effective to prevent said DC voltage offset in said DC output voltage, at the time of said transition from PFM mode operation to PWM mode operation of said multi-mode DC-DC converter.

6. The multi-mode DC-DC converter according to claim 5, wherein said PWM waveform generator includes an error amplifier, and wherein said mode transition control circuit is operative to establish an electrical parameter of said error amplifier, at the time of said transition from PFM mode operation to PWM mode operation of said multi-mode DC-DC converter, that is effective to compensate for one or more DC offset voltages in a voltage regulation path of said PWM waveform generator, and thereby equalize the value of said DC output voltage at the beginning of a PWM mode of operation of said converter with the value of said DC output voltage at the end of an immediately previous PFM mode of operation of said converter.

7. The multi-mode DC-DC converter according to claim 6, wherein said error amplifier comprises an integrating error amplifier, and wherein said mode transition control circuit includes a DC offset voltage correction circuit, that is operative to place a DC offset correction voltage across said integrating error amplifier at the time of said transition from PFM mode operation to PWM mode operation of said multi-mode DC-DC converter, that is effective to compensate for said one or more DC offset voltages in said voltage regulation path of said PWM waveform generator.

8. The multi-mode DC-DC converter according to claim 7, wherein said DC offset voltage correction circuit is operative, during a PFM mode of operation of said converter, to store information representative of said DC offset correction voltage as placed across said integrating error amplifier during an immediately preceding PWM mode of operation of said converter and, in response to a transition from said PFM mode of operation to a new PWM mode of operation of said converter, to place a DC offset correction voltage across said integrating error amplifier in accordance with said information.

9. The multi-mode DC-DC converter according to claim 7, wherein said PWM waveform generator includes a transconductance amplifier coupled to the output of said error amplifier, and wherein said DC offset voltage correction circuit is operative to inject, into the output of said transconductance amplifier, a current representative of said DC offset correction voltage across, and which is reflected back across inputs of said transimpedance amplifier as said DC offset correction voltage, so as to be placed thereby across and charge an integrating capacitor of said integrating error amplifier.

10. The multi-mode DC-DC converter according to claim 9, wherein said DC offset voltage correction circuit includes an up/down counter that is controllably incremented or decremented, based upon the polarity of the voltage differential across said integrating error amplifier, by transitions from PFM to PWM mode of operation of said converter, and a current generator, which is operative to generate said current in accordance with the count value of said up/down counter.

11. The multi-mode DC-DC converter according to claim 10, wherein said DC offset voltage correction circuit further includes an N-bit counter, which is operative, in response to the number of times that said up/down counter switches back and forth between an increment and a decrement condition reaching a prescribed number, to prevent further operation of said up/down counter by PWM mode transitions, so that the value of said current is fixed by the count value of said up/down counter.

12. A method of controlling the operation of a multi-mode DC-DC converter for supplying a regulated DC output voltage to a load, said multi-mode DC-DC converter including an output power switching stage having upper and lower power switches coupled between an input voltage terminal and a reference voltage terminal and having a common node therebetween coupled by way of an output inductor to an output node from which said regulated DC output voltage is supplied, a control circuit for controlling switching of said upper and lower power switches of said output power switching stage for respectively different modes of operation of said multi-mode DC-DC converter in accordance with respectively different switching control signals applied thereto, and a plurality of switching control signal generators, which are operative to generate said respectively different switching control signals, in response to which said control circuit controls switching of said upper and lower power switches of said output power switching stage during said respectively different modes of operation of said multi-mode DC-DC converter, said method comprising the steps of:

(a) monitoring an electrical parameter of one of said plurality of switching control signal generators; and (b) in the course of a transition between respectively different modes of operation of said converter, controlling the operation of said one of said plurality of switching control signal generators, in accordance with the electrical parameter monitored in step (a) so as to prevent an anomaly in said DC output voltage for said respectively different modes of operation of said converter.

13. The method according to claim 12, wherein said respectively different modes of operation of said multi-mode DC-DC converter correspond to continuous conduction mode (CCM) operation and discontinuous conduction mode (DCM) operation, and wherein step (b) comprises controlling the operation of said one of said plurality of switching control signal generators, in accordance with the electrical parameter monitored in step (a) so as to prevent the occurrence of a DC voltage offset in said DC output voltage at a transition from DCM mode operation to CCM mode operation of said multi-mode DC-DC converter.

14. The method according to claim 12, wherein said respectively different modes of operation of said multi-mode DC-DC converter correspond to pulse width modulation (PWM) mode and pulse frequency modulation (PFM) mode, and wherein step (b) comprises controlling the operation of said one of said plurality of switching control signal generators, in accordance with the electrical parameter monitored in step (a) so as to prevent the occurrence of a DC voltage offset in said DC output voltage at a transition from PFM mode operation to PWM mode operation of said multi-mode DC-DC converter.

15. The method according to claim 14, wherein said plurality of switching control signal generators include a PWM waveform generator which is operative to control the pulse width of a PWM waveform supplied thereby to said control circuit in accordance with a prescribed relationship between said regulated DC output voltage and a reference voltage, and a PFM waveform generator which is operative to control the pulse frequency of said PFM waveform supplied thereby to said control circuit in accordance with a prescribed relationship between said regulated DC output voltage and said reference voltage; and wherein step (b) comprises compensating for the value of the electrical parameter of said PWM waveform generator monitored in step (a), so as to prevent said DC voltage offset in said DC output voltage, at the time of said transition from PFM mode operation to PWM mode operation of said multi-mode DC-DC converter.

16. The method according to claim 15, wherein said PWM waveform generator includes an error amplifier, and wherein step (b) comprises establishing the value of said electrical parameter of said error amplifier, at the time of said transition from PFM mode operation to PWM mode operation of said multi-mode DC-DC converter, that is effective to compensate for one or more DC offset voltages in a voltage regulation path of said PWM waveform generator, and thereby equalize the value of said DC output voltage at the beginning of a PWM mode of operation of said converter with the value of said DC output voltage at the end of an immediately previous PFM mode of operation of said converter.

17. The method according to claim 16, wherein said error amplifier comprises an integrating error amplifier, and wherein step (b) comprises placing a DC offset correction voltage across said integrating error amplifier at the time of said transition from PFM mode operation to PWM mode operation of said multi-mode DC-DC converter, so as to compensate for said one or more DC offset voltages in said voltage regulation path of said PWM waveform generator.

18. The method according to claim 17, wherein step (b) comprises storing, during a PFM mode of operation of said converter, information representative of said DC offset correction voltage as placed across said integrating error amplifier during an immediately preceding PWM mode of operation of said converter and, in response to a transition from said PFM mode of operation to a new PWM mode of operation of said converter, placing a DC offset correction voltage across said integrating error amplifier in accordance with said information.

19. The method according to claim 17, wherein said PWM waveform generator includes a transconductance amplifier coupled to the output of said error amplifier, and wherein step (b) comprises injecting, into the output of said transconductance amplifier, a current representative of said DC offset correction voltage across, so that said current is reflected back across inputs of said transimpedance amplifier as said DC offset correction voltage, so as to be placed thereby across and charge an integrating capacitor of said integrating error amplifier.

20. For use with a pulse width modulation (PWM) mode to pulse frequency modulation (PFM) mode DC-DC converter for supplying a regulated DC output voltage to a load, said PWM mode to PFM mode DC-DC converter including an output power switching stage having upper and lower power switches coupled between an input voltage terminal and a reference voltage terminal and having a common node therebetween coupled by way of an output inductor to an output node from which said regulated DC output voltage is supplied;

a control circuit for controlling switching of said upper and lower power switches of said output power switching stage for said PWM and PFM modes of operation of said converter in accordance with respective PWM and PFM switching control signals applied thereto; and PWM and PFM switching control signal generators, which are operative to respectively generate PWM and PFM switching control signals, in response to which said control circuit controls switching of said upper and lower power switches of said output power switching stage during said PWM and PFM modes of operation of said converter, said PWM switching control signal generator including an error amplifier;

the improvement comprising:

a DC offset voltage correction circuit, that is coupled with said error amplifier, and is operative to place a DC offset correction voltage across said error amplifier at the time of said transition from PFM mode operation to PWM mode operation of said converter, that is effective to compensate for one or more DC offset voltages in a voltage regulation path of said PWM waveform generator.

*21. A multi-mode DC-DC converter for supplying a regulated DC output voltage to a load comprising:*

*an output power switching stage having at least one power switch coupled between an input voltage terminal and a reference voltage terminal and having a node coupled by way of an output inductor to an output node from which said regulated DC output voltage is supplied;*

*a control circuit for controlling switching of said at least one power switch of said output power switching stage for respectively different modes of operation of said multi-mode DC-DC converter in accordance with respectively different switching control signals applied thereto;*

*a plurality of switching control signal generators, which are operative to generate said respectively different switching control signals, in response to which said control circuit controls switching of said at least one power switch of said output power switching stage during said respectively different modes of operation of said multi-mode DC-DC converter; and*

*a mode transition control circuit, coupled with said plurality of switching control signal generators, and being operative to prevent an anomaly in said DC output voltage at a transition between respectively different modes of operation of said multi-mode DC-DC converter.*

*22. The multi-mode DC-DC converter according to claim 21, wherein said respectively different modes of operation of said multi-mode DC-DC converter correspond to pulse width modulation (PWM) mode and pulse frequency modulation (PFM) mode, and wherein said mode transition control circuit is operative to prevent the occurrence of a DC voltage offset in said DC output voltage at a transition from PFM mode operation to PWM mode operation of said multi-mode DC-DC converter, and wherein said plurality of switching control signal generators include:*

*a PWM waveform generator which is operative to control the pulse width of a PWM waveform supplied thereby to said control circuit in accordance with a prescribed relationship between said regulated DC output voltage and a reference voltage, and*

*a PFM waveform generator which is operative to control the pulse frequency of said PFM waveform supplied thereby to said control circuit in accordance with a prescribed relationship between said regulated DC output voltage and said reference voltage; and wherein*

*said mode transition control circuit is operative to establish an electrical parameter of said PWM waveform generator that is effective to prevent said DC voltage offset in said DC output voltage, at the time of said transition from PFM mode operation to PWM mode operation of said multi-mode DC-DC converter.*

*23. The multi-mode DC-DC converter according to claim 22, wherein said PWM waveform generator includes an error amplifier, and wherein said mode transition control circuit is operative to establish an electrical parameter of said error amplifier, at the time of said transition from PFM mode operation to PWM mode operation of said multi-mode DC-DC converter, that is effective to compensate for one or more DC offset voltages in a voltage regulation path of said PWM waveform generator, and thereby equalize the value of said DC output voltage at the beginning of a PWM mode of operation of said converter with the value of said DC output voltage at the end of an immediately previous PFM mode of operation of said converter.*

*24. The multi-mode DC-DC converter according to claim 23, wherein said error amplifier comprises an integrating error amplifier, and wherein said mode transition control circuit includes a DC offset voltage correction circuit, that is operative to place a DC offset correction voltage across said integrating error amplifier at the time of said transition from PFM mode operation to PWM mode operation of said multi-mode DC-DC converter, that is effective to compensate for said one or more DC offset voltages in said voltage regulation path of said PWM waveform generator.*

*25. The multi-mode DC-DC converter according to claim 24, wherein said PWM waveform generator includes a transconductance amplifier coupled to the output of said*

*error amplifier, and wherein said DC offset voltage correction circuit is operative to inject, into the output of said transconductance amplifier, a current representative of said DC offset correction voltage across, and which is reflected back across inputs of said transimpedance amplifier as said DC offset correction voltage, so as to be placed thereby across and charge an integrating capacitor of said integrating error amplifier.*

*26. The multi-mode DC-DC converter according to claim 25, wherein said DC offset voltage correction circuit includes an up/down counter that is controllably incremented or decremented, based upon the polarity of the voltage differential across said integrating error amplifier, by transitions from PFM to PWM mode of operation of said converter, and a current generator, which is operative to generate said current in accordance with the count value of said up/down counter.*

*27. The multi-mode DC-DC converter according to claim 26, wherein said DC offset voltage correction circuit further includes an N-bit counter, which is operative, in response to the number of times that said up/down counter switches back and forth between an increment and a decrement condition reaching a prescribed number, to prevent further operation of said up/down counter by PWM mode transitions, so that the value of said current is fixed by the count value of said up/down counter.*

*28. A method of controlling the operation of a multi-mode DC-DC converter for supplying a regulated DC output voltage to a load, said multi-mode DC-DC converter including:*

*an output power switching stage having at least one power switch coupled between an input voltage terminal and a reference voltage terminal and having a node therebetween coupled by way of an output inductor to an output node from which said regulated DC output voltage is supplied;*

*a control circuit for controlling switching of said at least one power switch of said output power switching stage for respectively different modes of operation of said multi-mode DC-DC converter in accordance with respectively different switching control signals applied thereto; and*

*a plurality of switching control signal generators, which are operative to generate said respectively different switching control signals, in response to which said control circuit controls switching of said at least one power switch of said output power switching stage during said respectively different modes of operation of said multi-mode DC-DC converter, said method comprising the steps of:*

*(a) monitoring an electrical parameter of one of said plurality of switching control signal generators; and*

*(b) in the course of a transition between respectively different modes of operation of said converter, controlling the operation of said one of said plurality of switching control signal generators, in accordance with the electrical parameter monitored in step (a) so as to prevent an anomaly in said DC output voltage for said respectively different modes of operation of said converter.*

*29. The method according to claim 28, wherein said respectively different modes of operation of said multi-mode DC-DC converter correspond to continuous conduction mode (CCM) operation and discontinuous conduction mode (DCM) operation, and wherein step (b) comprises controlling the operation of said one of said plurality of switching control signal generators, in accordance with the electrical parameter monitored in step (a) so as to prevent the occurrence of a DC voltage offset in said DC output voltage at a transition from DCM mode operation to CCM mode operation of said multi-mode DC-DC converter.*

*30. The method according to claim 28, wherein said respectively different modes of operation of said multi-mode DC-DC converter correspond to pulse width modulation (PWM) mode and pulse frequency modulation (PFM) mode, and*

*wherein step (b) comprises controlling the operation of said one of said plurality of switching control signal generators, in accordance with the electrical parameter monitored in step (a) so as to prevent the occurrence of a DC voltage offset in said DC output voltage at a transition from PFM mode operation to PWM mode operation of said multi-mode DC-DC converter.*

*31. A electronic system comprising:*

*a functional circuit; and*

*a multi-mode DC-DC converter for supplying a regulated DC output voltage to the functional circuit, the multi-mode DC-DC converter comprising:*

*an output power switching stage having at least one power switch having a node coupled by way of an output inductor to an output node;*

*a control circuit for controlling switching of said at least one power switch between different modes of operation of said multi-mode DC-DC converter in accordance with respectively different switching control signals applied thereto;*

*a plurality of switching control signal generators to generate said respectively different switching control signals, in response to which said control circuit controls switching of said at least one power switch of said output power switching stage during said respectively different modes of operation of said multi-mode DC-DC converter; and*

*a mode transition control circuit, coupled with said plurality of switching control signal generators, and being operative to prevent an anomaly in said DC output voltage at a transition between respectively different modes of operation of said multi-mode DC-DC converter.*

*32. The system of claim 31, wherein said respectively different modes of operation correspond to continuous conduction mode (CCM) operation and discontinuous conduction mode (DCM) operation, and wherein said mode transition control circuit prevents the occurrence of a DC voltage offset in said DC output voltage at a transition from DCM mode operation to CCM mode operation.*

*33. The system of claim 31, wherein said respectively different modes of operation correspond to pulse width modulation (PWM) mode and pulse frequency modulation (PFM) mode, and wherein said mode transition control circuit prevents the occurrence of a DC voltage offset in said DC output voltage at a transition from a PFM mode operation to a PWM mode operation of said multi-mode DC-DC converter.*

*34. The system of claim 33, wherein said plurality of switching control signal generators include:*

*a PWM waveform generator to control the pulse width of a PWM waveform supplied thereby to said control circuit in accordance with a prescribed relationship between said regulated DC output voltage and a reference voltage, and*

*a PFM waveform generator to control the pulse frequency of said PFM waveform supplied thereby to said control circuit in accordance with a prescribed relationship between said regulated DC output voltage and said reference voltage; and*

*wherein said mode transition control circuit establishes an electrical parameter of said PWM waveform generator that is effective to prevent said DC voltage offset in said DC output voltage, at the time of said transition from the PFM mode operation to the PWM mode operation of said multi-mode DC-DC converter.*

*35. The system of claim 31, wherein the functional circuit includes a processor.*

*36. A method of controlling the operation of a multi-mode DC-DC converter for supplying a regulated DC output voltage to a load, said method comprising:*

*monitoring an electrical parameter of one of a plurality of switching control signal generators; and*

*controlling the operation of said one of the plurality of switching control signal generators in the course of a transition between different modes of operation of the multi-mode DC-DC converter, the controlling being based on the monitored electrical parameter, to prevent an anomaly in a DC output voltage for the different modes of operation of the multi-mode DC-DC converter.*

*37. The method according to claim 36, wherein said different modes of operation correspond to continuous conduction mode (CCM) operation and discontinuous conduction mode (DCM) operation, and wherein controlling the operation of said one of the plurality of switching control signal generators comprises controlling the operation of said one of said plurality of switching control signal generators to prevent a DC voltage offset in said DC output voltage at a transition from DCM mode operation to CCM mode operation.*

*38. The method according to claim 37, wherein said different modes of operation correspond to pulse width modulation (PWM) mode and pulse frequency modulation (PFM) mode, and wherein controlling the operation of said one of the plurality of switching control signal generators comprises controlling the operation of said one of said plurality of switching control signal generators to prevent the occurrence of a DC voltage offset in said DC output voltage at a transition from a PFM mode operation to a PWM mode operation.*

*39. The method according to claim 38, wherein monitoring the electrical parameter of one of the plurality of the switching control signal generators comprises monitoring a PWM waveform generator.*

*40. The method according to claim 39, wherein said PWM waveform generator includes a transconductance amplifier coupled to the output of said error amplifier, and wherein controlling the operation of said one of the plurality of switching control signal generators comprises injecting, into the output of said transconductance amplifier, a current representative of a DC offset correction voltage across, so that said current is reflected back across inputs of said transimpedance amplifier as said DC offset correction voltage, so as to be placed thereby across and charge an integrating capacitor of said integrating error amplifier.*

*41. The method according to claim 36, further comprising:*

*establishing a value of the electrical parameter of an error amplifier in the PWM waveform generator at the time of transition from a PFM mode operation to a PWM mode operation; and*

*equalizing a value of said DC output voltage at a beginning of the PWM mode of operation of said multi-mode DC-DC converter with a value of said DC output voltage at the end of an immediately previous PFM mode of operation of said multi-mode DC-DC converter.*

*42. The method according to claim 41, wherein said error amplifier comprises an integrating error amplifier, and wherein establishing the value of the electrical parameter of the error amplifier comprises placing a DC offset correction voltage across the integrating error amplifier at the time of said transition from the PFM mode operation to the PWM mode operation.*

*43. A control chip for use with a multi-mode DC-DC converter, the control chip comprising:*

*a control circuit to control switching between different modes of operation of the multi-mode DC-DC converter in accordance with respectively different switching control signals applied to at least one power switch of an output power switching stage; and*

*a mode transition control circuit, coupled with a plurality of switching control signal generators, the mode transition control circuit operative to prevent an anomaly in a DC output voltage of the multi-mode DC-DC converter during a transition between the respectively different modes of operation.*

*44. The control chip of claim 43, wherein the transition between the respectively different modes of operation comprises a transition between a PFM mode and a PWM mode, and wherein the mode transition control circuit comprises:*

*a DC offset correction circuit having a VNEG input and a VPOS input, the DC offset correction circuit including;*

*a NAND gate having an input coupled to a PWM output of a PFM-PWM mode comparator,*

*a differential amplifier having inputs coupled to the VNEG input and the VPOS input of the DC offset correction circuit, and*

*an up/down counter configured to receive an up/down count control input from the differential amplifier, wherein a clocking operation of up/down counter is controlled by an output of the NAND gate, and wherein transitions in the PWM output are used to clock the up/down counter.*

*45. The control chip of claim 44, wherein the NAND gate provides a count signal to a CETbar input of the up/down counter with each successive transition from the PFM mode to the PWM mode.*

*46. The control chip of claim 43, wherein the plurality of switching control signal generators coupled with the mode transition control circuit include:*

*a PWM waveform generator which is operative to control the pulse width of a PWM waveform supplied to the control circuit, and*

*a PFM waveform generator which is operative to control the pulse frequency of a PFM waveform supplied to the control circuit, wherein the mode transition control circuit establishes an electrical parameter of said PWM waveform generator that is effective to prevent said DC voltage offset in said DC output voltage, at the time of the transition from a PFM mode operation to a PWM mode operation of the multi-mode DC-DC converter.*

* * * * *